(12) United States Patent
Nolan et al.

(10) Patent No.: US 10,313,842 B2
(45) Date of Patent: *Jun. 4, 2019

(54) TRANSCEIVER SELECTION SYSTEM

(71) Applicant: Intel Corporation, Santa Clara, CA (US)

(72) Inventors: Keith Nolan, Mullingar (IE); Mark Kelly, Leixlip (IE)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/617,530

(22) Filed: Jun. 8, 2017

(65) Prior Publication Data

US 2017/0374531 A1  Dec. 28, 2017

Related U.S. Application Data

(63) Continuation of application No. 14/865,528, filed on Sep. 25, 2015, now Pat. No. 9,699,620.

(51) Int. Cl.
| | |
|---|---|
| H04W 24/00 | (2009.01) |
| H04W 4/04 | (2009.01) |
| H04L 29/08 | (2006.01) |
| H04W 16/14 | (2009.01) |
| H04L 29/06 | (2006.01) |
| H04W 88/00 | (2009.01) |

(52) U.S. Cl.
CPC ............ *H04W 4/04* (2013.01); *H04L 67/10* (2013.01); *H04L 67/18* (2013.01); *H04L 67/34* (2013.01); *H04L 69/18* (2013.01); *H04W 16/14* (2013.01); *H04W 88/00* (2013.01)

(58) Field of Classification Search
None
See application file for complete search history.

(56) References Cited

U.S. PATENT DOCUMENTS

| | | |
|---|---|---|
| 6,160,998 A | 12/2000 | Wright et al. |
| 7,274,907 B1 | 9/2007 | Perotti et al. |
| 2004/0029621 A1 | 2/2004 | Karaoguz et al. |
| 2005/0245202 A1 | 11/2005 | Ranta et al. |
| 2006/0063560 A1 | 3/2006 | Herle |
| 2008/0200180 A1 | 8/2008 | Dunn |
| 2013/0267181 A1 | 10/2013 | Ayatollahi et al. |
| 2013/0303136 A1 | 11/2013 | Van Wyk et al. |
| 2014/0106745 A1 | 4/2014 | Paczkowski et al. |
| 2014/0274009 A1 | 9/2014 | Do et al. |
| 2015/0215844 A1 | 7/2015 | Davis et al. |
| 2016/0127996 A1 | 5/2016 | Patil et al. |

OTHER PUBLICATIONS

International Search Report and Written Opinion issued in PCT Application No. PCT/US2016/048739, dated Dec. 12, 2016, 10 pages.
International Preliminary Report on Patentability and Written Opinion issued in PCT Application No. PCT/US2016/048739, dated Apr. 5, 2018, 7 pages.

*Primary Examiner* — Erika A Washington
(74) *Attorney, Agent, or Firm* — Grossman, Tucker, Perreault & Pfleger, PLLC

(57) ABSTRACT

One embodiment provides an apparatus. The apparatus includes a device. The device includes at least one transceiver. The device further includes transceiver selection logic to determine whether each of the at least one transceiver complies with transceiver regulations associated with a location of the device.

24 Claims, 4 Drawing Sheets

TRANSCEIVER SELECTION SYSTEM

CROSS-REFERENCE TO RELATED APPLICATION

The present application is a continuation of U.S. patent application Ser. No. 14/865,528 filed Sep. 25, 2015, now U.S. Pat. No. 9,699,620, issued on Jul. 4, 2017, the entire disclosure of which is incorporated herein by reference.

FIELD

The present disclosure relates to a system, in particular to, a transceiver selection system.

BACKGROUND

The International Telecommunications Union (ITU), in its International Radio Regulations, divides the world into three ITU regions for the purposes of managing the global radio spectrum. Each region has its own set of frequency allocations (i.e., frequency bands). Thus, operation in a frequency band that is allowed in one region may be prohibited in another region. For example, operation in the 915 MHz (Megahertz) band (902 MHz to 928 MHz) that is permitted in ITU region 2 (Americas) under FCC (Federal Communications Commission) part 15 rules, is prohibited in ITU Region 1 (Europe, Middle East and Africa (EMEA)). The 915 MHz frequency band may be utilized for mesh networks and relatively low-cost sensor deployments, for example.

In addition to the frequency bands, allowable transceiver operating parameters may also vary by region. For example, a transceiver located inside a building may be allowed a higher transmitter power than a transceiver located outside the building. The rules are complex, vary by region, country and/or subregion, and may change over time. Thus, it is difficult for a designer to ensure that a device, e.g., transceiver, will comply with the regulatory rules at its deployment location(s). This problem is compounded for the Internet of Things (IoT) and/or mesh networks that include a relatively high number of devices.

BRIEF DESCRIPTION OF DRAWINGS

Features and advantages of the claimed subject matter will be apparent from the following detailed description of embodiments consistent therewith, which description should be considered with reference to the accompanying drawings, wherein:

Figure 1:
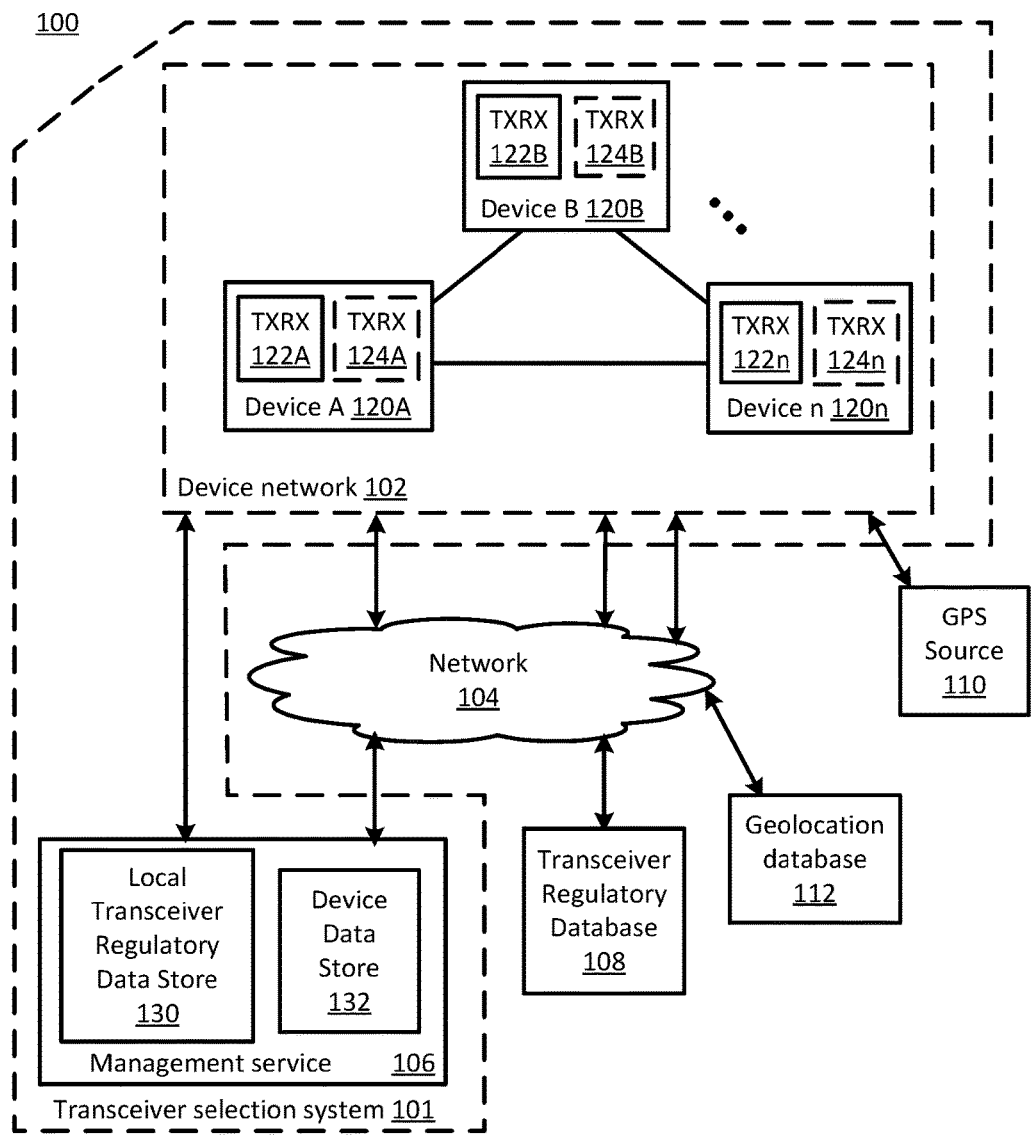
FIG. 1 illustrates a functional block diagram of a system, including a transceiver selection system consistent with several embodiments of the present disclosure.

Although the following Detailed Description will proceed with reference being made to illustrative embodiments, many alternatives, modifications, and variations thereof will be apparent to those skilled in the art.

DETAILED DESCRIPTION

Generally, this disclosure relates to a transceiver selection system. An apparatus, method and/or system are configured to enable or disable operation of each of at least one transceiver based, at least in part, on whether the transceiver complies with transceiver regulations associated with a location of a device that includes the at least one transceiver. The apparatus, method and/or system are further configured to determine the location of the device.

A transceiver regulatory database and/or a local transceiver regulatory data store may be queried to determine allowable operating frequency bands and allowable operating parameters for the transceiver(s). An associated operating frequency range for the transceiver(s) may then be determined. In one example, the transceiver may be queried to determine its associated operating frequency range. In another example, the transceiver may be queried to determine an associated transceiver identifier (ID). The transceiver identifier may then be utilized to query the transceiver regulatory database and/or the local transceiver regulatory data store to determine whether the transceiver operating frequency range is within the allowable frequency band for the location.

If the transceiver's operating frequency range is not within the allowable frequency band then the transceiver may be disabled. If the transceiver's operating frequency range is in the allowable frequency band, then the transceiver may be configured, by, e.g., transceiver selection logic, so that the transceiver's operating parameters comply with the allowable operating parameters associated with the location. If the transceiver cannot be configured so that its operating parameters comply with the allowable operating parameters associated with the location, the transceiver may be disabled.

In an embodiment, the device may include one transceiver. In another embodiment, the device may include a plurality of transceivers. In one example, each transceiver of the plurality of transceivers may be configured to comply with (i.e., operate in) a respective region, country and/or subregion. In other words, each transceiver may be configured with a respective operating frequency range that corresponds to a respective allowable frequency band and/or allowable subband for a country and/or subregion of one of the regions. In this example, the transceiver configured to comply with the transceiver regulations for the region, country and/or subregion that includes the location of the device may be selected.

In another example, two transceivers may be included in a device and both transceivers may be configured to comply with one region, country and/or subregion. Each transceiver may be configured to operate over a respective frequency range that is included in the allowable frequency band for the region, country and/or subregion. For a device network that corresponds to a mesh network and that includes one coordinator node, the respective frequency ranges may be the same. Thus, the transceiver may be redundant providing a coordinator node redundant (i.e., relatively more reliable) communication capability. For a plurality of device networks, a first frequency range may correspond to a first device network and a second frequency range may correspond to a second device network. Thus, the device may be configured to communicate in both device networks.

Thus, a device, and/or a transceiver included in the device, may be configured to comply with the transceiver regulations associated with their location or the transceiver may be disabled (i.e., prevented from operating) if the transceiver does not comply with the transceiver regulations. Thus, violating transceiver regulations for a location may be avoided.

FIG. 1 illustrates a functional block diagram of a system 100, including a transceiver selection system 101 consistent with several embodiments of the present disclosure. The transceiver selection system 101 includes a plurality of devices 102A, 102B, . . . , 102n and a management service 106. Management service 106 may include and/or may correspond to a plurality of computing systems, e.g., servers. System 100 may further include a network 104, a transceiver regulatory database 108, a GPS (global positioning system) source 110 and/or a geolocation database 112.

Each device 102A, 102B, . . . , 102n includes a respective first transceiver 122A, 122B, . . . , 122n. Each device may further include one or more respective second transceivers, e.g., second transceivers 124A, 124B, . . . , 124n. The first transceivers 122A, 122B, . . . , 122n and/or the second transceivers 124A, 124B, . . . , 124n may include, but are not limited to cellular modems, wireless mesh network transceivers, Wi-Fi® transceivers, low power wide area (LPWA) transceivers, and/or near field communications transceivers (NFC). The devices 120A, 120B, . . . , 120n may include, but are not limited to, a mobile telephone including, but not limited to a smart phone (e.g., iPhone®, Android®-based phone, Blackberry®, Symbian®-based phone, Palm®-based phone, etc.); a personal digital assistant (e.g., an intelligent personal digital assistant); a wearable device (e.g., wearable computer, "smart" watches, smart glasses, smart clothing, etc.) and/or system; an Internet of Things (IoT) networked device including, but not limited to, a sensor system (e.g., environmental, position, motion, etc.) and/or a sensor network (wired and/or wireless); a computing system (e.g., a server, a workstation computer, a desktop computer, a laptop computer, a tablet computer (e.g., iPad®, GalaxyTab® and the like), an ultraportable computer, an ultramobile computer, a netbook computer and/or a subnotebook computer; etc. In an embodiment, one of the devices, e.g., device 120A, may be a coordinator node, as described herein.

The devices 120A, 12 B, . . . , 120n each includes (i.e., contains) a respective first transceiver TXRX 122A, 122B, . . . , 122n. One or more of the devices 120A, 120B, . . . , and/or 120n may further include a respective second transceiver 124A, 124B, . . . , and/or 124n.

The plurality of devices 120A, 120B, . . . , 120n may be included in a device network 102. Each device 120A, 120B, . . . , 120n may be coupled, wired and/or wirelessly, to one or more other devices 120A, 120B, . . . , and/or 120n. Device network 102 may comply and/or be compatible with one or more wired and/or wireless network communication protocols, as described herein. For example, device network 102 may correspond to a mesh network and/or may include a cellular telephone network and/or a wireless communication network, e.g., Wi-Fi®.

A mesh network generally includes a plurality of devices, e.g., devices 120A, 120B, . . . , 120n. The devices 120A, 120B, . . . , 120n may be configured to communicate information (e.g., data, commands and/or responses to commands) with physically adjacent other devices. For example, a mesh network may include a plurality of sensors (e.g., air quality, temperature, environmental) and/or elements of the Internet of Things (IoT). One device, e.g., device 120A, may correspond to a coordinator node. The coordinator node is configured to receive the information from the other devices 120B, . . . , 120n. The coordinator node 120A is further configured to communicate information between, e.g., management service 106 and one or more of devices 120A, 120B, . . . and/or 120n. The coordinator node may include a plurality of transceivers (i.e., redundant transceivers), e.g., TXRX 122A and TXRX 124A, as described herein.

Device network 102 may be stationary or may be mobile. For example, device network 102 may be included in an aircraft, ship and/or other vehicle capable of changing location. In another example, device network 102 may correspond to a mesh network that includes a plurality of environmental sensors that may be located in fixed locations inside a building and/or outdoors. In another example, device network 102 may correspond to a mesh network that includes a plurality of sensors that are configured to gather data at a first location and may then be moved to a second location to continue data-gathering. Thus, in this example, the device network 102 may be mobile or stationary.

Device network 102 may be configured to communicate with management service 106, transceiver regulatory database 108 and/or geolocation database 112 via network 104. Network 104 may comply and/or be compatible with one or more wireless and/or wireless network communication protocols and/or standards, as described herein.

Transceiver regulatory database 108 is configured to contain transceiver regulatory information related to location. The transceiver regulatory information may include an allowable operating frequency band, one or more frequency subband(s) and/or allowable transceiver configuration parameter values associated with the frequency band and/or one or more frequency subband(s). The transceiver regulatory information may be related to transceiver(s) included in devices 120A, 120B, . . . , 120n. Location may correspond to a region, e.g., an ITU region, a country included in the region, a subregion (e.g., a portion of a country), etc.

Transceiver regulatory database 108 may be utilized by devices 120A, 120B, . . . , 120n to determine whether a selected transceiver (and thus the device that includes the selected transceiver) complies with transceiver regulations for a location. For example, transceiver regulatory database 108 may be accessed using a location identifier as an index. An allowable operating frequency band may be determined based, at least in part, on the location.

Allowable operating parameter values associated with the allowable operating frequency band may similarly be determined using transceiver regulatory database 108. For example, allowable operating parameters may include, but are not limited to, allowable transmitter power level, duty cycle, modulation scheme, type (e.g., directionality) of antenna, height of antenna and/or operating location constraints (e.g., inside a building or other structure and/or outdoors).

Duty cycle corresponds to a percentage of time that a transmitter is actively transmitting a signal. Transceiver regulations may include restrictions related to duty cycle. For example, for at least part of the European 868 MHz ISM (industrial, scientific and medical) band, the duty cycle is 10 percent (%). Thus, a transceiver located in Europe that is configured to transmit and/or receive in this part of the ISM band and is compliant may only be actively transmitting information for a total of six minutes per hour. Modulation schemes may include, but are not limited to, binary phase shift keying, quadrature phase shift keying, quadrature amplitude modulation, frequency shift keying, direct sequence spread spectrum, orthogonal frequency division multiplexing, frequency modulation and amplitude modulation. The allowable operating parameters may include a plurality of transmitter power levels, with each power level related to type of antenna, height of antenna and/or operating location. The transceiver regulatory database 108 may be updated periodically, and thus, is configured to contain up-to-date allowable transceiver parameter values.

In some embodiments, transceiver regulatory database 108 may further include transceiver identifiers. The transceiver identifiers may be associated with frequency bands and/or transceiver operating parameter values that correspond to compliance with a specified location. In other words, using a selected transceiver identifier as an index, the transceiver regulatory database 108 may be queried to determine whether the selected transceiver complies with the transceiver regulations for a location. If the selected transceiver complies with the transceiver regulations for the location, the associated transceiver operating parameter values may then be retrieved, as described herein.

GPS source 110 may be configured to provide location information to any of the devices 120A, 120B, . . . and/or 120n that are not inside a structure, i.e., that have a line of sight to the GPS source 110. As is known, GPS is a satellite-based global positioning system configured to provide location and/or time data to devices that include an appropriate GPS receiver and that have a line of sight to a plurality of satellites. A device, e.g., device 120A, that is unable to utilize GPS source 110 may be configured to access geolocation database 112 to determine the location. In some embodiments, location information may be stored locally in the device 120A, a priori (i.e., prior to deployment), if device location is known and fixed. In this embodiment, location information may remain static until changed.

Geolocation database 112 may include device identifier(s) related to location, and thus may be accessed using a device identifier. Geolocation database 112 may then be utilized to determine a location of the device, e.g., a location associated with the device identifier may looked up. For example, the device identifier may correspond to an IP (Internet protocol) address of the device and/or a network interface, as described herein. In another example, the device identifier may be a unique identifier associated with the device. In some situations, there may be a plurality of geolocation databases and at least some geolocation databases may be publicly accessible. Each geolocation database, e.g., geolocation database 108, may be updated periodically.

Management service 106 may be coupled to device network 102 via a network, e.g., network 104, and/or directly. One or more of device(s) 120A, 120B, . . . and/or 120n may be configured to communicate with management service 106. For example, for a mesh network, the coordinator node, e.g., device 102A, may be configured to communicate with management service 106 via network 104 and/or directly. Management service 106 may be configured to provide location information and/or allowable transceiver parameter(s) based, at least in part, on location, to devices 120A, 120B, . . . , 120n. Devices 120A, 120B, . . . , 120n may be further configured to provide status and/or operational data to management service 106, as described herein. Communication with management service 106 may be intermittent and/or may be periodic.

Management service 106 may include a local transceiver regulatory data store 130 and a device data store 132. Local transceiver regulatory data store 130 is configured to store transceiver regulatory data related to location for one or more of device(s) 120A, 120B, . . . and/or 120n. Local transceiver regulatory data store 130 may store at least a subset of the information stored in transceiver regulatory database 108. Local transceiver regulatory data may include allowable operating frequency band and/or frequency subbands associated with the deployment location of one or more of device(s) 102A, 102B, . . . and/or 102n. Local transceiver regulatory data may further include allowable transceiver configuration parameter values associated with the frequency band and/or one or more frequency subband(s). Location may correspond to a region, e.g., an ITU region, a country included in the region, a subregion (e.g., a portion of a country), etc. The transceiver regulatory data may generally be indexed by a location identifier and/or a transceiver identifier.

Device data store 132 may be configured to store device information related to the devices 120A, 120B, . . . , 120n. Device information may include device characteristic information as well as deployment information. Device characteristic information is related to device capability. Deployment information is related to a deployment configuration of the transceiver(s) associated with a device 120A, 120B, . . . and/or 120n. Device characteristic information may include, but is not limited to, a device model identifier, a transceiver identifier, a transceiver type, operating frequency range(s), maximum transmitter power, antenna characteristics (e.g., antenna height), etc. Deployment information may include, but is not limited to, a device model identifier, transceiver identifier(s) for each device, whether each transceiver complies with the deployment location for each device, configuration parameter(s) for each transceiver, whether each transceiver is enabled or disabled, etc. Device information may be associated with a device identifier configured to identify the associated device. Thus, a device identifier may be utilized as an index into the device data store 132. Device data store 132, e.g., deployment information, may be updated intermittently and/or periodically in response to receipt of one or more report(s) from one or more device(s) 120A, 120B, . . . and/or 120n, as described herein.

In operation, a device, e.g., device 120A, may be configured to determine a location of the device and to enable or disable operation of a transceiver, e.g., TXRX 122A, included in the device based, at least in part, on whether the transceiver 122A complies with the transceiver regulations for the location of the device. For example, the device location may be determined based, at least in part, on data acquired from GPS source 110, geolocation database 108 and/or location information stored on device 120A, as described herein. Device 120A may then be configured to determine whether the identified transceiver operating frequency range complies with the transceiver regulatory data (e.g., allowable operating frequency band) associated with the determined location. If the transceiver's operating frequency range is not within the allowable frequency band than the transceiver 122A may be disabled. If the transceiver's operating frequency range is in the allowable frequency band, then the transceiver 122A may be configured so that the transceiver's operating parameters comply with the allowable operating parameters associated with the location. If the transceiver cannot be configured so that its operating parameters comply with the allowable operating parameters associated with the location, the transceiver 122A may be disabled. In embodiments where the device, e.g., device 120A, includes a plurality of transceivers, e.g., TXRX 122A, 124A, a transceiver, e.g., TXRX 122A or TXRX 124A, that has a compliant operating frequency range and compliant operating parameters may be selected. A status of each transceiver 122A, 124A may then be reported to management service 106 for storage and/or updating device data store 132.

A transceiver may be configured to transmit and/or receive using one or more channels. In other words, a transceiver operating frequency range may include one or more channels, with each channel corresponding to at least a portion of the transceiver operating frequency range. Channel information may be included in the transceiver operating parameters. For example, channel information may include a number of channels and/or bandwidth associated with each channel for a transceiver operating frequency range. The channel information may be related to and/or associated with transmitter power for some locations. For example, based, at least in part, on location, the transceiver may be configured for relatively low-power operation using a first channel when the corresponding the device is located in a first region, country, and/or subregion, and/or may be configured for relatively higher power operation using a second channel when the corresponding device is located in a second region, country, and/or subregion. Thus, based, at least in part, on location, a variety of combinations of transceiver operating parameter values may be implemented, facilitating compliance with transceiver regulations associated with the location of the device.

Thus, transceiver selection system 101 may include a device network 102 that may be located remote from management service 106. The devices 120A, 120B, . . . 120n included in device network 102 are configured to communicate with each other. One or more of devices 120A, 120B, . . . and/or 120n may be configured to query transceiver regulatory database 108 and/or local transceiver regulatory data store 130 to determine whether an associated transceiver complies with the transceiver regulations. One or more of device(s) 120A, 120B, . . . and/or 120n may communicate information and/or status to management service 106. Devices 120A, 120B, . . . 120n are configured to determine their respective locations, e.g., using GPS source 110, geolocation database 108 and/or stored location information and to then determine allowable operating frequency band(s) and/or allowable operating parameters based, at least in part, on the determined location. The associated transceiver may or may not then be allowed to operate, as described herein.

Figure 2:
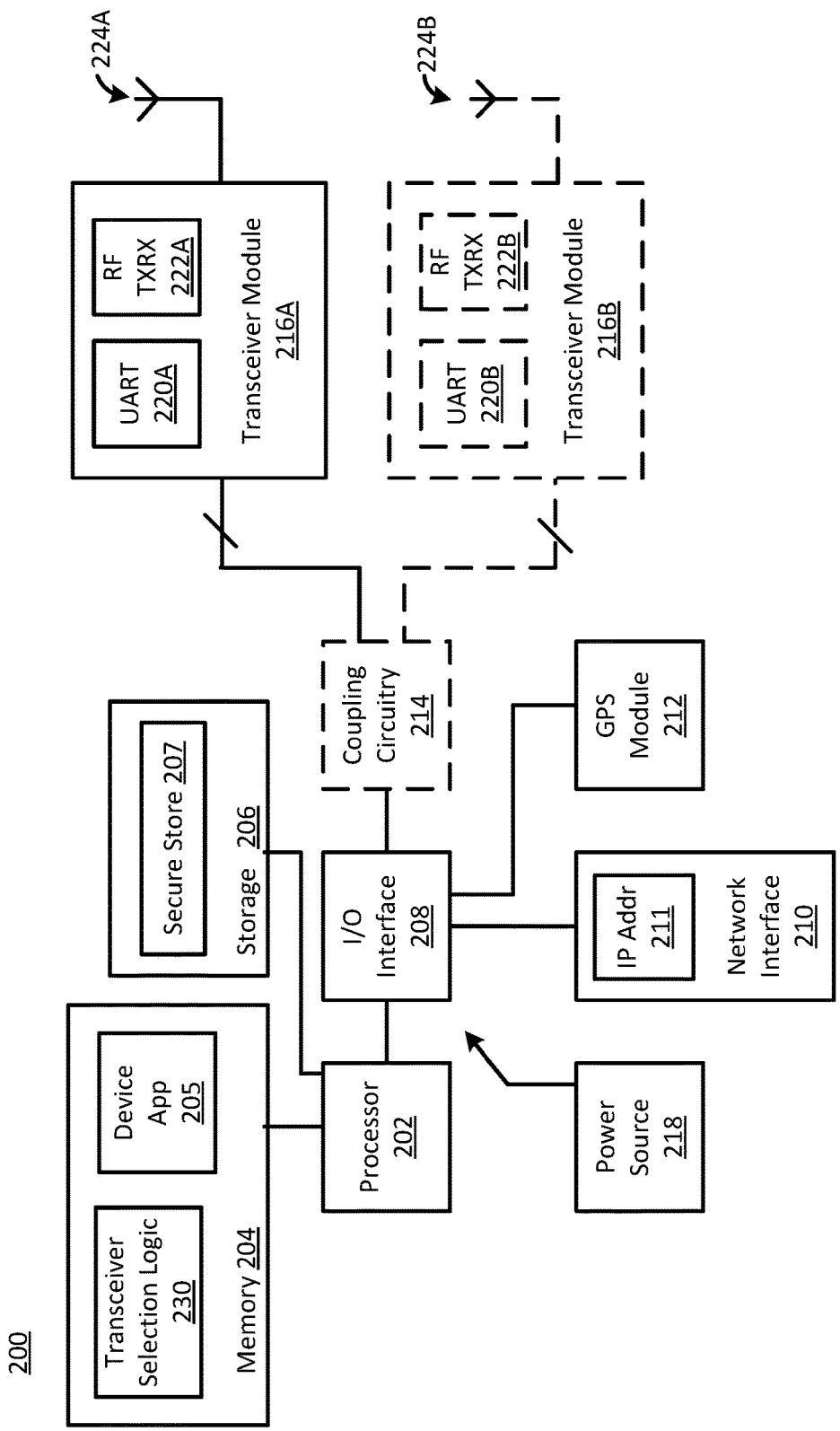
FIG. 2 illustrates a functional block diagram of an example device consistent with several embodiments of the present disclosure.

FIG. 2 illustrates a functional block diagram of an example device 200 consistent with several embodiments of the present disclosure. Example 200 is one example of devices 120A, 120B, . . . , 120n of FIG. 1. Device 200 includes a processor 202, memory 204, storage 206, input/output (I/O) interface 208, network interface 210, GPS module 212, transceiver module 216A, antenna 224A and power source 218. Transceiver module 216A may correspond to or may include TXRX 122A, 122B, . . . or 122n of FIG. 1. Device 200 may include coupling circuitry 214, transceiver module 216B and antenna 224B. Transceiver module 216B may correspond to or may include TXRX 124A, 124B, . . . or 124n of FIG. 1.

Processor 202 may include, but is not limited to, a single core (i.e., processing unit) processor, a multicore processor, a microprocessor, a microcontroller, an application specific integrated circuit (ASIC), application specific instruction processor (ASIP), etc. Processor 202 is configured to perform operations of device 200.

Storage 206 may include any type of nonvolatile memory and/or storage and may include, for example, flash memory. Storage 206 may include a secure store 207 that may be configured to store transceiver operating parameters, as described herein. Secure store 207 may correspond to a trusted boot partition configured to allow write access and/or signed and/or encrypted storage location(s).

I/O interface 208 is configured to couple processor 202 to network interface 210, GPS module 212 and, if present, coupling circuitry 214. I/O interface 208 is further configured to couple transceiver module 216A to processor 202. I/O interface 208 may be further configured to couple coupling circuitry 214 to processor 202 and may thus couple transceiver module 216A and/or transceiver module 216B to processor 202. I/O interface 208 may comply and/or be compatible with one or more serial communication protocols, e.g., Inter-Integrated Circuit (I2C), Serial Peripheral Interface (SPI), Serial RS-232, TIA/RS-485, as described herein.

Network interface 210 is configured to couple device 200 to, e.g., network 104 of FIG. 1. Network interface 210 is configured to comply and/or be compatible with one or more communication protocols, as described herein. For example, network interface 210 may be configured to comply with a Transport Control Protocol/Internet Protocol (TCP/IP) communication protocol. Network interface 210 may further include an address, e.g., an IP address 211, that may be utilized to determine a location of device 200. The IP address 211 and an associated location identifier may then be included in a geolocation database, e.g., geolocation database 112, as described herein.

GPS module 212 may be configured to communicate with one or more GPS sources, e.g., GPS source 110, in order to determine a location of device 200. For example, GPS module 212 may be configured to acquire and/or determine a latitude and a longitude that corresponds to the location of device 200.

Power source 218 is configured to supply power to the elements of device 200. For example power source 218 may include at least one voltage source, e.g., a battery, solar cell(s), power supply, etc. Power source 218 may be configured to supply voltages in the range of 1.8 volts to 12 volts.

In some embodiments, device 200 may include coupling circuitry 214 and/or transceiver module 216B. In other words, device 200 may include a plurality of transceivers, as described herein. In these embodiments, coupling circuitry 214 may be configured to multiplex transceiver modules 216A, 216B. Transceiver module 216A may include a universal asynchronous receiver transmitter (UART) 220A and a radio frequency (RF) transceiver (TXRX) 222A. Similarly, transceiver module 216B may include UART 220B and RF transceiver 222B. UARTs 220A, 220B are configured to receive parallel input data and provide corresponding serial output data and/or receive serial input data and provide corresponding parallel output data. For example, a UART may typically include a shift register.

Coupling circuitry 214 may be configured to receive serial data from, and/or provide serial data to, I/O interface 208. Coupling circuitry 214 may be further configured to provide parallel data to, and/or receive parallel data from, transceiver module(s) 216A and/or 216B. For example, coupling circuitry 214 may include (i.e., may provide) a serial interface that complies and/or is compatible with one or more serial protocol(s), e.g., Inter-Integrated Circuit (I2C), serial peripheral interface (SPI) and/or vendor-specific variants of SPI. Coupling circuitry 214 may include (i.e., may provide) a parallel interface compatible with UARTs 220A, 220B. Transceiver modules 216A, 216B are coupled to processor 202 via a plurality of respective serial interfaces. In other words, the transceiver modules 216A, 216B are both coupled to processor 202 but each is exposed as a separate serial interface, e.g., Serial A, Serial B. For example, the processor 202 may interact with transceiver module 216A via Serial A and the processor 202 may interact with transceiver module 216B via Serial B.

Transceiver(s) 222A, 222B may be removable. For example, UARTs 220A, 220B and/or transceiver modules 216A, 216B may be configured to receive one of a variety of transceivers, each transceiver having an associated operating frequency range and/or set of operating parameters, as described herein. Volume manufacturing of a plurality of devices, e.g., device 200, may thus be facilitated.

Transceiver(s) 222A, 222B are configured to receive serial transmit data via respective UARTs 220A, 220B from processor 202, to modulate the serial transmit data onto an RF carrier to produce a transmit RF signal and to transmit the transmit RF signal via respective antennas 224A, 224B. Transceiver(s) 222A, 222B are further configured to receive a receive RF signal via respective antennas 224A, 224B that includes an RF carrier modulated with serial receive data, to demodulate the receive RF signal to extract the serial receive data and to provide the serial receive data to respective UARTs 220A, 220B for provision to processor 202. Each RF signal has an associated carrier frequency and an associated channel bandwidth. The channel bandwidth is associated with the carrier frequency, the transmit data and/or the receive data. Each RF carrier frequency and channel bandwidth are related to the operating frequency range(s) of the transceiver(s) 222A, 222B. Each channel bandwidth is further related to the wireless communication standard and/or protocol with which the transceiver(s) 222A, 222B may comply. In other words, each transceiver may correspond to an implementation of a selected wireless communication standard and/or protocol, e.g., IEEE 802.11 a/b/g/n for Wi-Fi® and/or IEEE 802.15.4 for wireless mesh networks using Zigbee routing, as described herein.

Device 200 may include device app 205 and transceiver selection logic 230. For example, device app 205 and transceiver selection logic 230 may be included in memory 204. Device app 205 may be configured to communicate with other devices via, for example, transceiver module 216A and/or transceiver module 216B (if present). Device app 205 is configured to perform operations associated with device 200. Operations may include, but are not limited to, data gathering, communication with other devices and/or management service 106, etc. Processor 202 may be configured to execute device app 205 and/or transceiver selection logic 230.

Transceiver selection logic 230 may be configured to determine whether each of the at least one transceiver 222A and/or 222B complies with transceiver regulations associated with a location of device 200. Whether the transceiver(s) 222A and/or 222B complies with the transceiver regulations (i.e., are compliant) for the location of device 200 may be determined once or may be repeated one or more times while device 200 is deployed. For example, whether the transceiver(s) 22A and/or 222B are compliant may be determined once at a first deployment of device 200. In another example, whether the transceiver(s) 222A and/or 222B are compliant may be determined each time device 200 is activated, e.g., powered up. In another example, whether the transceiver(s) 222A and/or 222B are compliant may be determined in response to a request and/or command from management service 106. In another example, whether the transceiver(s) 222A and/or 222B are compliant may be determined in response to detecting a change in location of device 200. In another example, whether the transceiver(s) 222A and/or 222B are compliant may be determined if a change in transceiver operating parameters has been detected, e.g., if the transceiver 222A and/or 222B is removed and/or installed in transceiver module 216A.

Transceiver selection logic 230 may be configured to identify the transceiver(s) 222A and/or 222B, determine a location of device 200 and query a transceiver regulatory database (e.g., transceiver regulatory database 108 of FIG. 1) and/or a local transceiver regulatory data store (e.g., local transceiver regulatory data store 130) in order to determine whether the transceiver(s) 222A and/or 222B comply with transceiver regulations for the location.

Transceiver selection logic 230 may be configured to identify a transceiver, e.g., RF TXRX 222A. Transceiver selection logic 230 may be configured to query transceiver 222A and/or UART 220A to determine the transceiver identifier. For example, transceiver selection logic 230 may be configured to provide a command to transceiver module 216A requesting the transceiver identifier. The transceiver module 216A may then reply with the requested transceiver identifier. The command may be a member of a set of commands used by transceiver selection logic 230 and/or device app 205 for communication with transceiver module 216A (and 216B, if present). For example, the command set may be related to an AT command set, historically utilized for communication with one or more modems. Of course, other commands may be utilized configured to communicate commands and/or queries to, and receive responses from, transceiver module 216A (and 216B, if present) may be utilized. Transceiver 222A may be identified prior to and/or after querying the transceiver regulatory database and/or the local transceiver regulatory data store.

Transceiver selection logic 230 is configured to determine the deployment location of device 200. For example, transceiver selection logic 230 may request location data from GPS module 212, geolocation information via network interface 210 and/or may query storage 206 and/or secure store 207 for stored location information. For example, the deployment location may be stored, a priori, to for example, storage 206 and/or secure store 207. In this example, the deployment location of device 200 may be fixed. If the deployment location changes, the stored location information may be updated. For example, the stored location information may be updated remotely via communication with management service 106. In another example, the stored location information may be updated locally via physical access to device 200.

Transceiver selection logic 230 may be configured to query a transceiver regulatory database, e.g., transceiver regulatory database 108, and/or a local transceiver regulatory data store, e.g., local transceiver regulatory data store 130. Transceiver selection logic 230 may be configured to retrieve transceiver regulatory information based, at least in part, on the deployment location of device 200, as described herein.

Transceiver selection logic 230 may be further configured to query transceiver 222A and/or UART 220A to determine a transceiver operating frequency range and/or transceiver operating parameters. Transceiver selection logic 230 may then be configured to determine whether the transceiver 222A complies with transceiver regulations for the location. For example, transceiver selection logic 230 may be configured to compare the transceiver operating frequency range with the allowable frequency band for the location. If the transceiver operating frequency range is within the allowable frequency band, transceiver selection logic 230 may then retrieve the allowable operating parameters from, e.g., the transceiver regulatory database 108 and/or local transceiver regulatory data store 130, and configure the transceiver 222A operating parameters to correspond to the allowable operating parameters for the location. The transceiver operating parameters may then be stored in a secure store, e.g., secure store 207. If the transceiver's operating frequency range is not within the allowable frequency band, then the transceiver to 222A may be disabled. The status (e.g., enabled with operating parameter values or disabled)

of the transceiver 222A may then be communicated, i.e., reported to, e.g., management service 106.

In some embodiments, transceiver regulatory database 108 and/or local transceiver regulatory data store 130 may contain transceiver identifiers associated with locations where the transceivers are compliant, as described herein. For example, operating frequency range and/or transceiver operating parameters for newly manufactured transceivers may be associated with transceiver identifiers and provided to transceiver regulatory database 108. Compliant transceiver identifiers may then be associated with corresponding locations. In these embodiments, transceiver selection logic 230 may be configured to query transceiver regulatory database 108 and/or local transceiver regulatory data store 130 using the location and the transceiver, e.g., transceiver 222A, identifier, to determine whether the transceiver 222A is compliant, as described herein.

In some embodiments, device 200 may include a plurality of transceiver modules 216A, 216B. In these embodiments, transceiver selection logic 230 may be configured to identify both transceivers 222A, 222B. Transceiver selection logic 230 may be further configured to query the transceiver regulatory database 108 and/or the local transceiver regulatory data store 130 to determine whether either or both transceivers 222A, 222B comply with transceiver regulations for the location, as described herein. If one transceiver complies with the transceiver regulations for the location, the noncompliant transceiver may be disabled and the compliant transceiver's operating parameters may be configured, as described herein. If neither transceiver complies with the transceiver regulations for the location, then both transceivers may be disabled. If both transceivers comply with the transceiver regulations for the location, at least one transceiver's operating parameters may be configured. For example, if both transceivers are compliant and their respective operating frequency ranges differ, both may be enabled if communication with two device networks is desired. In another example, if both transceivers are compliant and their respective operating frequency ranges of the same, one or both may be enabled. If one is enabled, the other may be powered down and/or put in a sleep state, e.g., to conserve energy. In this example, device 200 may correspond to a coordinator node with redundant transceivers 222A, 222B configured to provide relatively more reliable communication capability to device 200. The status of both transceivers may be stored for example in secure store 207 and may be provided to the management service 106 for storage to device data store 132.

Thus, whether each of the at least one transceiver complies with transceiver regulations associated with the location of the device 200 may be determined. A transceiver that does not comply with the transceiver regulations may be disabled. One or more operating parameter(s) associated with a transceiver that complies with the transceiver regulations may be configured. Thus, operation of a noncompliant transceiver may be avoided.

Figure 3:
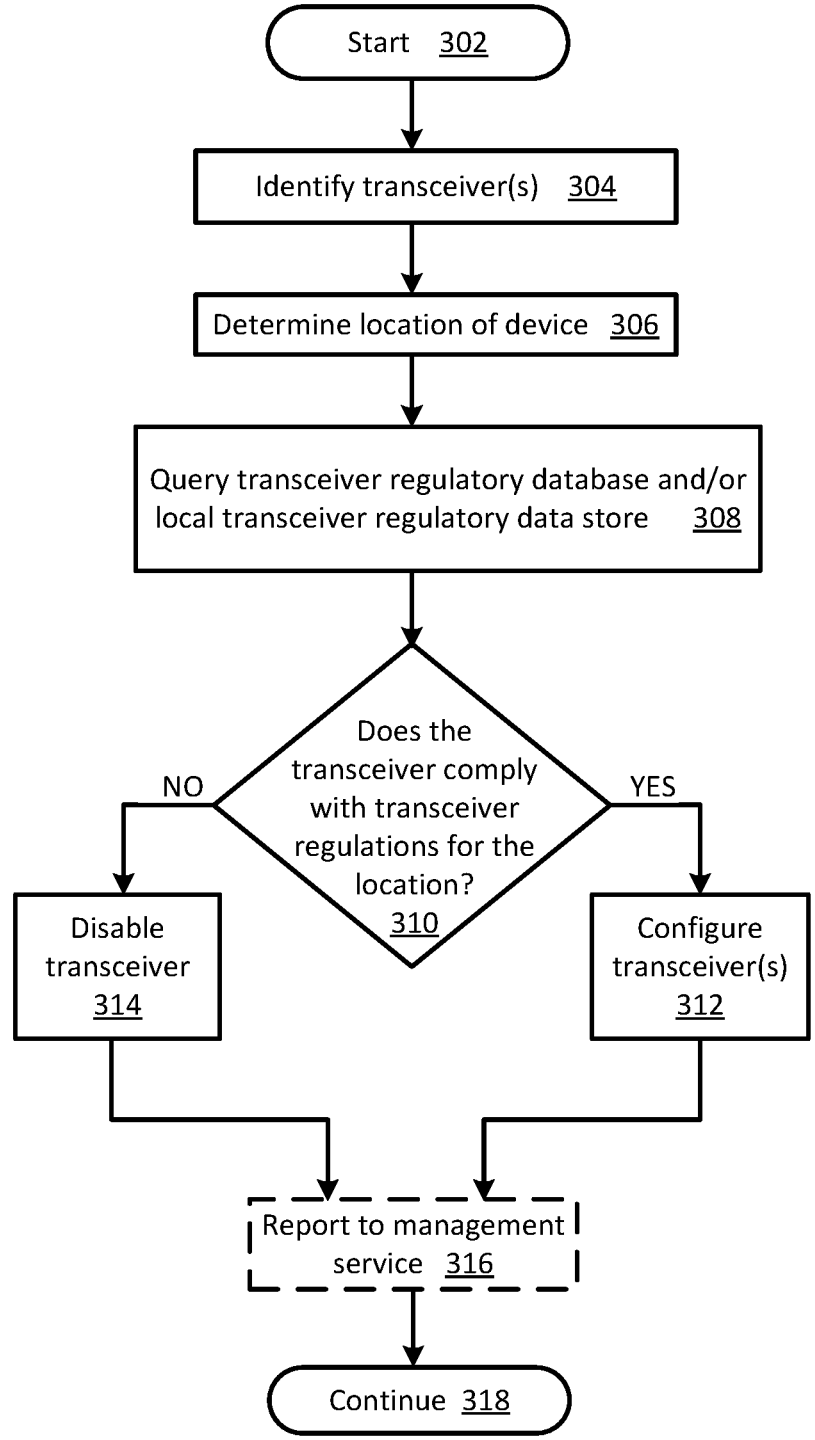
FIG. 3 is a flowchart of transceiver selection system operations according to various embodiments of the present disclosure.

FIG. 3 is a flowchart 300 of transceiver selection operations according to various embodiments of the present disclosure. In particular, the flowchart 300 illustrates determining whether a device includes a transceiver that complies with the transceiver regulations for a location of the device. The operations may be performed, for example, by device 120A, 120B, . . . , 120n of FIG. 1 and/or device 200 and transceiver selection logic 230 of FIG. 2.

Operations of this embodiment may begin with start 302. Operation 304 includes identifying transceiver(s). For example, one or more transceiver(s) included in a device may be identified. A location of the device may be determined at operation 306. Operation 308 may include querying a transceiver regulatory database and/or a local transceiver regulatory data store. For example, the local transceiver regulatory data store may be included in a management service. Whether the transceiver complies with the transceiver regulations for the location may be determined at operation 310. For example, operation 310 may include determining allowable frequency band, comparing a transceiver frequency range to the allowable frequency band and retrieving allowable operating parameters if the operating frequency range is within the allowable frequency band. If the transceiver is not compliant, the transceiver may be disabled at operation 314. If the transceiver is compliant, the transceiver may be configured at operation 312. A report may then be transmitted to a management service at operation 316. Program flow may then continue at operation 318.

Thus, whether a transceiver complies with transceiver regulations may be determined based, at least in part, on the location of the device that contains the transceiver. A compliant transceiver may then be enabled, i.e., configured to operate, and/or a noncompliant transceiver may be disabled. Thus, operation of a noncompliant transceiver may be avoided.

Figure 4:
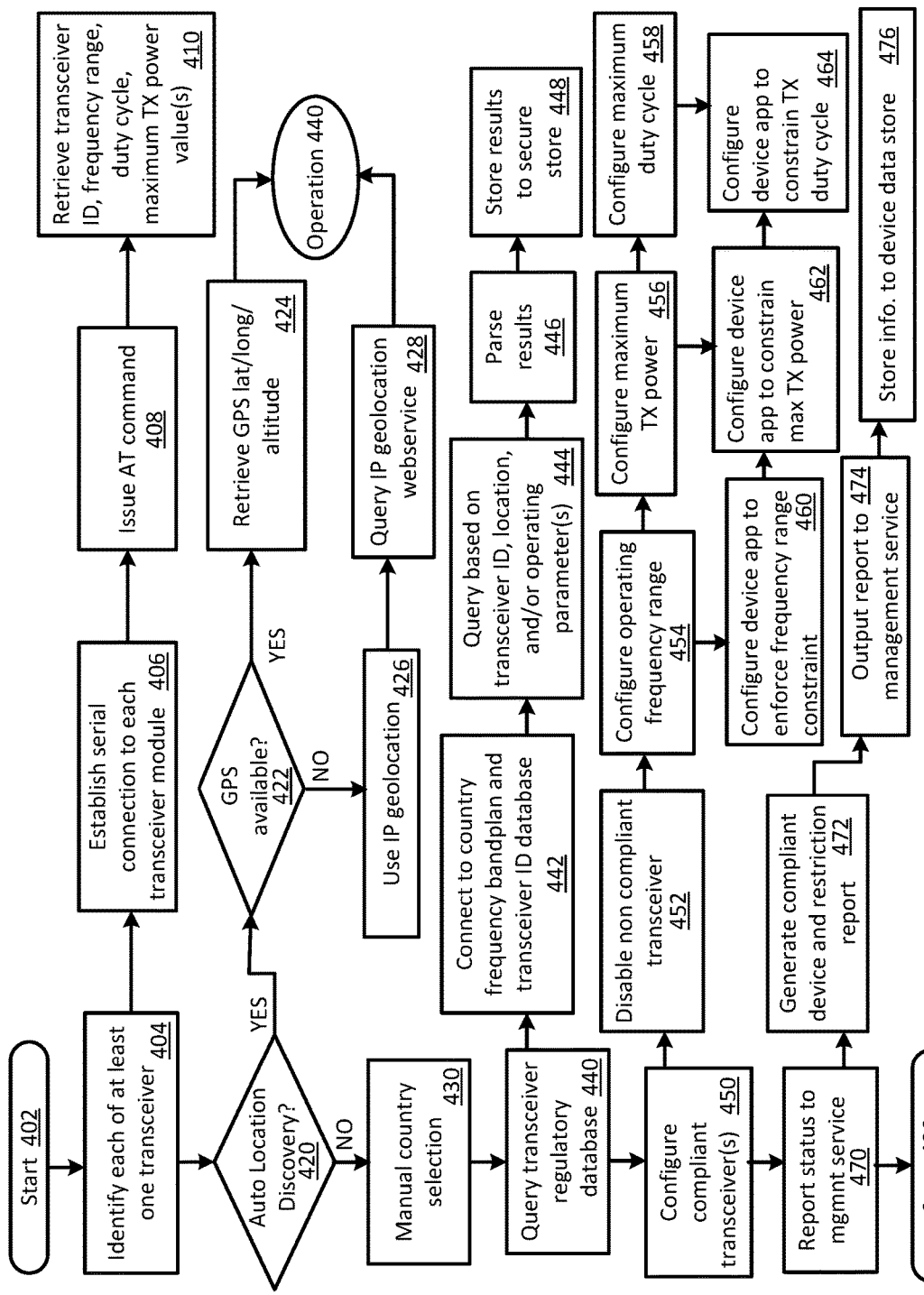
FIG. 4 is a flowchart of example transceiver selection system operations according to one embodiment of the present disclosure.

FIG. 4 is a flowchart 400 of example transceiver selection operations according to one embodiment of the present disclosure. In particular, the flowchart 400 illustrates determining whether a device includes a transceiver that complies with the transceiver regulations for a location of the device. The operations may be performed, for example, by device 120A, 120B, . . . , 120n and/or management service 106 of FIG. 1 and/or device 200 including transceiver selection logic 230 and/or device app 205 of FIG. 2.

Operations of this embodiment may begin with start 402. Operation 404 includes identifying each of at least one transceiver. Operation 404 may include operations 406, 408, and 410. Operation 406 includes establishing a serial connection to each transceiver module. Operation 408 includes issuing an AT command. For example, the AT command may correspond to a serial modem command, as described herein. Operation 410 includes retrieving a transceiver identifier, frequency range, duty cycle, and/or maximum transmitter power value(s). This information may be retrieved from one or more transceiver(s) and/or transceiver module(s).

Whether auto location discovery is enabled may be determined at operation 420. Auto location discovery may include operations 422, 424, 426 and/or 428. If auto location discovery is not enabled, manual region and/or country selection may be performed at operation 430. For example, deployment location may be stored to the device prior to deployment. If auto location discovery is enabled, whether a GPS is available may be determined at operation 422. If the GPS is available, GPS latitude, longitude and/or altitude may be retrieved at operation 424. Program flow may then proceed to operation 440. If GPS is not available, IP geolocation may be utilized at operation 426. A geolocation web service may be queried at operation 428. Program flow may then proceed to operation 440.

A transceiver regulatory database may be queried at operation 440. Operation 440 may include operations 442, 444, 446, and 448. Operation 442 includes connecting to a country frequency band plan and transceiver identifier database. For example, frequency band plan may include allowable frequency band(s) and one or more corresponding allowable operating parameters related to a region, country and/or subregion. The transceiver regulatory database may be queried based, at least in part, on one or more of a transceiver identifier, device location, and/or operating parameter(s). Results may be parsed at operation 446. In other words, one or more allowable operating parameter values may be extracted from a query result. For example, the query result may include an aggregation of data in, for example, an ASCII (American Standard Code for Information Interchange) string format. The aggregation may include, but is not limited to, the minimum and maximum frequency ranges allowed, minimum and maximum transmit power levels, allowable duty cycles, etc. Operation 446 is configured to retrieve the allowable values and ranges from the database query result. Results may be stored in a secure store at operation 448.

Compliant transceiver(s) may be configured at operation 450. Operation 450 may include operations 452, 454, 456, 458, 460, 462 and/or 464. Operation 452 includes disabling noncompliant transceiver(s). Operation 454 includes configuring an operating frequency range. A device app may be configured to enforce the operating frequency range at operation 460. Operation 456 includes configuring a maximum transmitter power. The device app may be configured to constrain the maximum transmitter power at operation 462. A maximum duty cycle may be configured at operation 458. The device app may be configured to constrain the transmitter duty cycle at operation 464. For example, the device app may be configured by transceiver selection logic.

A status may then be reported to a management service at operation 470. For example, the status may be reported to management service 106 of FIG. 1. Operation 470 includes operations 472, 474 and 476. Operation 472 includes generating a compliant device and restriction report. For example, the report may include transceiver identifier(s) associated with a respective indicator that corresponds to compliant or noncompliant (i.e., restricted). In another example, the report may contain a current time in either human readable or Unix Epoch timestamp formats, the location (if available) in placename/company and/or GPS coordinates, the make and model of the transceiver(s), the compliance check result, e.g., fail or pass, information regarding the compliance check result (e.g., country restriction, power restriction, antenna height restriction, duty cycle restriction). The report may further include the number of attempted uses of the transceiver. The report may be output at operation 474. For example, the report may be communicated to the management service. The information may be stored to a device data store at operation 476. Program flow may then stop at operation 480.

Thus, whether a transceiver complies with transceiver regulations may be determined based, at least in part, on the location of the device that contains the transceiver. A compliant transceiver may then be enabled, i.e., configured to operate, and/or a noncompliant transceiver may be disabled.

While the flowcharts of FIGS. 3 and 4 illustrate operations according various embodiments, it is to be understood that not all of the operations depicted in FIGS. 3 and 4 are necessary for other embodiments. In addition, it is fully contemplated herein that in other embodiments of the present disclosure, the operations depicted in FIGS. 3 and/or 4 and/or other operations described herein may be combined in a manner not specifically shown in any of the drawings, and such embodiments may include less or more operations than are illustrated in FIGS. 3 and 4. Thus, claims directed to features and/or operations that are not exactly shown in one drawing are deemed within the scope and content of the present disclosure.

Thus, an apparatus, method and/or system are configured to enable or disable operation of each of at least one transceiver based, at least in part, on whether the transceiver complies with transceiver regulations associated with a location of a device that includes the at least one transceiver. The apparatus, method and/or system may be further configured to determine the location of the device. A transceiver regulatory database and/or a local transceiver regulatory data store may be queried to determine allowable operating frequency bands and allowable operating parameters for the transceiver(s). An associated operating frequency range for the transceiver(s) may then be determined. If the transceiver operating frequency range is not within the allowable frequency band then the transceiver may be disabled. If the transceiver operating frequency range is in the allowable frequency band, then the transceiver may be configured, by, e.g., transceiver selection logic, so that the transceiver's operating parameters comply with the allowable operating parameters associated with the location. If the transceiver cannot be configured so that its operating parameters comply with the allowable operating parameters associated with the location, the transceiver may be disabled.

In an embodiment, the device may include one transceiver. In another embodiment, the device may include a plurality of transceivers. In one example, each transceiver of the plurality of transceivers may be configured to comply with a respective region, country and/or subregion. In this example, the transceiver configured to comply with the transceiver regulations for the region, country and/or subregion that includes the location of the device may be selected. In another example, two transceivers may be included in a device and both transceivers may be configured to comply with one region, country and/or subregion. Each transceiver may be configured to operate over a respective frequency range that is included in the allowable frequency band for the region, country and/or subregion. For a device network that corresponds to a mesh network and that includes one coordinator node, the respective frequency ranges may be the same. Thus, a coordinator node may be provided redundant communication capability. For a plurality of device networks, a first frequency range may correspond to a first device network and a second frequency range may correspond to a second device network. Thus, the device may be configured to communicate in both device networks.

Thus, a device and/or a transceiver included in the device may be configured to comply with the transceiver regulations associated with their location or the transceiver may be disabled if the transceiver does not comply with the transceiver regulations. Thus, operation of a noncompliant transceiver may be avoided.

As used in any embodiment herein, the term "logic" may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

"Circuitry", as used in any embodiment herein, may comprise, for example, singly or in any combination, hard-wired circuitry, programmable circuitry such as computer processors comprising one or more individual instruction processing cores, state machine circuitry, and/or firmware that stores instructions executed by programmable circuitry. The logic may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc.

The foregoing provides example system architectures and methodologies, however, modifications to the present disclosure are possible. The processor may include one or more processor cores and may be configured to execute system software. System software may include, for example, an operating system. Device memory may include I/O memory buffers configured to store one or more data packets that are to be transmitted by, or received by, a network interface. The operating system (OS) may be configured to manage system resources and control tasks that are run on, e.g., device(s) 120A, 120B, . . . , 120n and/or management service 106. For example, the OS may be implemented using Microsoft® Windows®, HP-UX®, Linux®, or UNIX®, although other operating systems may be used. In another example, the OS may be implemented using Android™, iOS, Windows Phone® or BlackBerry®.

Network 104 may include a packet switched network. Device(s) 120A, 120B, . . . , 120n, management service 106, transceiver regulatory database 108 and/or geolocation database 112 may be capable of communicating with each other using a selected packet switched network communications protocol. One example communications protocol may include an Ethernet communications protocol which may be capable permitting communication using a Transmission Control Protocol/Internet Protocol (TCP/IP). The Ethernet protocol may comply or be compatible with the Ethernet standard published by the Institute of Electrical and Electronics Engineers (IEEE) titled "IEEE 802.3 Standard", published in December, 2008 and/or later versions of this standard. Alternatively or additionally, device(s) 120A, 120B, . . . , 120n, management service 106, transceiver regulatory database 108 and/or geolocation database 112 may be capable of communicating with each other using an X.25 communications protocol. The X.25 communications protocol may comply or be compatible with a standard promulgated by the International Telecommunication Union-Telecommunication Standardization Sector (ITU-T). Alternatively or additionally, device(s) 120A, 120B, . . . , 120n, management service 106, transceiver regulatory database 108 and/or geolocation database 112 may be capable of communicating with each other using a frame relay communications protocol. The frame relay communications protocol may comply or be compatible with a standard promulgated by Consultative Committee for International Telegraph and Telephone (CCITT) and/or the American National Standards Institute (ANSI). Alternatively or additionally, device(s) 120A, 120B, . . . , 120n, management service 106, transceiver regulatory database 108 and/or geolocation database 112 may be capable of communicating with each other using an Asynchronous Transfer Mode (ATM) communications protocol. The ATM communications protocol may comply or be compatible with an ATM standard published by the ATM Forum titled "ATM-MPLS Network Interworking 2.0" published August 2001, and/or later versions of this standard. Of course, different and/or after-developed connection-oriented network communication protocols are equally contemplated herein.

Device(s) 120A, 120B, . . . , 120n, management service 106, transceiver regulatory database 108 and/or geolocation database 112 may comply and/or be compatible with one or more communication specifications, standards and/or protocols.

For example, device(s) 120A, 120B, . . . , 120n may comply and/or be compatible with an IPv6 (Internet Protocol version 6) over Low Power Wireless Personal Area Networks (6LoWPAN) standard: RFC (Request for Comments) 6282, titled Compression Format for IPv6 Datagrams over IEEE 802.15.4-Based Networks, published by the Internet Engineering Task Force (IETF), September 2011, and/or later and/or related versions of this standard.

In another example, device(s) 120A, 120B, . . . , 120n may comply and/or be compatible with IEEE (Institute of Electrical and Electronics Engineers) 802.15.4-2006 standard titled: IEEE Standard for Information technology—Telecommunications and information exchange between systems—Local and metropolitan area networks—Specific requirements Part 15.4: Wireless Medium Access Control (MAC) and Physical Layer (PHY) Specifications for Low Rate Wireless Personal Area Networks (LR-WPANS), published in 2006 and/or later and/or related versions of this standard.

In another example, device(s) 120A, 120B, . . . , 120n may comply and/or be compatible with a ZigBee specification and/or standard, published and/or released by the ZigBee Alliance, Inc., including, but not limited to, ZigBee 3.0, draft released November 2014, ZigBee RF4CE, ZigBee IP, and/or ZigBee PRO published in 2012, and/or later and/or related versions of these standards.

In another example, device(s) 120A, 120B, . . . , 120n, management service 106, transceiver regulatory database 108 and/or geolocation database 112 may comply and/or be compatible with IEEE Std 802.11™-2012 standard titled: IEEE Standard for Information technology—Telecommunications and information exchange between systems—Local and metropolitan area networks—Specific requirements Part 11: Wireless LAN Medium Access Control (MAC) and Physical Layer (PHY) Specifications, published in March 2012 and/or earlier and/or later and/or related versions of this standard, including, for example, IEEE Std 802.11ac™-2013, titled IEEE Standard for Information technology—Telecommunications and information exchange between systems, Local and metropolitan area networks—Specific requirements, Part 11: Wireless LAN Medium Access Control (MAC) and Physical Layer (PHY) Specifications; Amendment 4: Enhancements for Very High Throughput for Operation in Bands below 6 GHz, published by the IEEE, December 2013.

Device(s) 120A, 120B, . . . , 120n, management service 106, transceiver regulatory database 108 and/or geolocation database 112 may comply and/or be compatible with one or more third generation (3G) telecommunication standards, recommendations and/or protocols that may comply and/or be compatible with International Telecommunication Union (ITU) Improved Mobile Telephone Communications (IMT)-2000 family of standards released beginning in 1992, and/or later and/or related releases of these standards. For example, device(s) 120A, 120B, . . . , 120n, management service 106, transceiver regulatory database 108 and/or geolocation database 112 may comply and/or be compatible with one or more CDMA (Code Division Multiple Access) 2000 standard(s) and/or later and/or related versions of these standards including, for example, CDMA2000 1×RTT, 1× Advanced and/or CDMA2000 1×EV-DO (Evolution-Data Optimized): Release 0, Revision A, Revision B, Ultra Mobile Broadband (UMB). In another example, device(s) 120A, 120B, . . . , 120n, management service 106, transceiver regulatory database 108 and/or geolocation database 112 may comply and/or be compatible with UMTS (Universal Mobile Telecommunication System) standard and/or later and/or related versions of these standards.

Device(s) 120A, 120B, . . . , 120n, management service 106, transceiver regulatory database 108 and/or geolocation database 112 may comply and/or be compatible with one or more fourth generation (4G) telecommunication standards, recommendations and/or protocols that may comply and/or be compatible with ITU IMT-Advanced family of standards released beginning in March 2008, and/or later and/or related releases of these standards. For example, device(s) 120A, 120B, . . . , 120n, management service 106, transceiver regulatory database 108 and/or geolocation database 112 may comply and/or be compatible with IEEE standard: IEEE Std 802.16™-2012, title: IEEE Standard for Air Interface for Broadband Wireless Access Systems, released August 2012, and/or related and/or later versions of this standard. In another example, device(s) 120A, 120B, . . . , 120n, management service 106, transceiver regulatory database 108 and/or geolocation database 112 may comply and/or be compatible with Long Term Evolution (LTE), Release 8, released March 2011, by the Third Generation Partnership Project (3GPP) and/or later and/or related versions of these standards, specifications and releases, for example, LTE-Advanced, Release 10, released April 2011.

Transceivers(s) TXRX 122A, 122B, . . . , 122n, 124A, 124B, . . . , and/or 124n, I/O interface 208, coupling circuitry 214, transceiver module(s) 216A and/or 216B, UART(s) 220A and/or 220B, transceiver(s) 222A and/or 222B may comply and/or be compatible with one or more serial communication protocol(s).

For example, transceivers(s) TXRX 122A, 122B, . . . , 122n, 124A, 124B, . . . , and/or 124n, I/O interface 208, coupling circuitry 214, transceiver module(s) 216A and/or 216B, UART(s) 220A and/or 220B, transceiver(s) 222A and/or 222B may be configured to comply and/or be compatible with one or more serial peripheral interface (SPI) standard(s) and/or protocol(s). SPI is a synchronous serial communication interface typically used for short distance communication.

In another example, transceivers(s) TXRX 122A, 122B, . . . , 122n, 124A, 124B, . . . , and/or 124n, I/O interface 208, coupling circuitry 214, transceiver module(s) 216A and/or 216B, UART(s) 220A and/or 220B, transceiver(s) 222A and/or 222B may comply and/or be compatible with standard TIA-232 (also and/or formerly known as RS-232), Interface Between Data Terminal Equipment and Data Circuit-Terminating Equipment Employing Serial Binary Data Interchange, Revision F, dated Oct. 1, 1997 and including amendments and changes through Reaffirmation Notice, Dec. 7, 2012, published by Telecommunications Industry Assn. (TIA), and/or later and/or related versions of this standard.

In another example, transceivers(s) TXRX 122A, 122B, . . . , 122n, 124A, 124B, . . . , and/or 124n, I/O interface 208, coupling circuitry 214, transceiver module(s) 216A and/or 216B, UART(s) 220A and/or 220B, transceiver(s) 222A and/or 222B may comply and/or be compatible with standard TIA-485 (also and/or formerly known as RS-485), Electrical Characteristics of Generators and Receivers for Use in Balanced Digital Multipoint Systems, Revision A, dated Mar. 1, 1998 and including amendments and changes through Reaffirmation Notice, Dec. 7, 2012, published by TIA, and/or later and/or related versions of this standard.

In another example, transceivers(s) TXRX 122A, 122B, . . . , 122n, 124A, 124B, . . . , and/or 124n, I/O interface 208, coupling circuitry 214, transceiver module(s) 216A and/or 216B, UART(s) 220A and/or 220B, transceiver(s) 222A and/or 222B may comply and/or be compatible with I2C-bus specification Version 2.1, published in 2000, and maintained by NXP Semiconductors, Inc., and/or later and/or related versions of this specification, for example, document UM10204, I2C-bus specification and user manual, Rev. 6, published April 2014.

In another example, transceivers(s) TXRX 122A, 122B, . . . , 122n, 124A, 124B, . . . , and/or 124n, I/O interface 208, coupling circuitry 214, transceiver module(s) 216A and/or 216B, UART(s) 220A and/or 220B, transceiver(s) 222A and/or 222B may comply and/or be compatible with System Management Bus (SMBus) Specification, Version 2.0, published by the System Management Interface Forum, Inc., August 2000 and/or Version 3.0, published December 2014, and/or later and/or related versions of this specification.

In another example, transceivers(s) TXRX 122A, 122B, . . . , 122n, 124A, 124B, . . . , and/or 124n, I/O interface 208, coupling circuitry 214, transceiver module(s) 216A and/or 216B, UART(s) 220A and/or 220B, transceiver(s) 222A and/or 222B may comply and/or be compatible with protocol ISO/IEC 18092:2013, Information technology—Telecommunications and information exchange between systems—Near Field Communication—Interface and Protocol (NFCIP-1), second edition, published March 2013 by the International Organization for Standardization (ISO)/International Electrotechnical Commission (IEC), and/or later and/or related versions of this protocol.

In another example, transceivers(s) TXRX 122A, 122B, . . . , 122n, 124A, 124B, . . . , and/or 124n, I/O interface 208, coupling circuitry 214, transceiver module(s) 216A and/or 216B, UART(s) 220A and/or 220B, transceiver(s) 222A and/or 222B may comply and/or be compatible with one or more protocol specifications published by the NFC Forum, Wakefield, Mass., including, but not limited to, NFC Logical Link Control Protocol (LLCP) 1.2 Technical Specification, adopted Mar. 20, 2014; NFC Digital Protocol Technical Specification 1.1, adopted Mar. 20, 2014; NFC Activity Technical Specification v1.1, adopted Jan. 23, 2014; NFC Simple NDEF Exchange Protocol (SNEP) Technical Specification, adopted Aug. 31, 2011; NFC Analog Technical Specification 1.1, adopted May 27, 2015; NFC Controller Interface (NCI) Technical Specification v1.1, adopted Jan. 23, 2014, and/or later and/or related versions of these protocol specifications.

In another example, transceivers(s) TXRX 122A, 122B, . . . , 122n, 124A, 124B, . . . , and/or 124n, I/O interface 208, coupling circuitry 214, transceiver module(s) 216A and/or 216B, UART(s) 220A and/or 220B, transceiver(s) 222A and/or 222B may be configured to comply and/or be compatible with one or more of the Weightless-N open standard, based on a low power wide area (LPWAN) star network architecture, managed by Weightless SIG, Cambridge, United Kingdom; a SIGFOX UNB (Ultra Narrow Band) based radio technology protocol, managed by SIGFOX, Labege France; and/or the LoRaWAN™ network protocol, e.g., LoRaWAN 1.0 Specification, published by the LoRa™ Alliance, San Ramon, Calif., and/or later and/or related versions of these standards, protocols and/or specifications.

Memory 204 may include one or more of the following types of memory: semiconductor firmware memory, programmable memory, non-volatile memory, read only memory, electrically programmable memory, random access memory, flash memory, magnetic disk memory, and/or optical disk memory. Either additionally or alternatively memory 204 may include other and/or later-developed types of computer-readable memory.

Embodiments of the operations described herein may be implemented in a computer-readable storage device having stored thereon instructions that when executed by one or more processors perform the methods. The processor may include, for example, a processing unit and/or programmable circuitry. The storage device may include a machine readable storage device including any type of tangible, non-transitory storage device, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage devices suitable for storing electronic instructions.

In some embodiments, a hardware description language (HDL) may be used to specify circuit and/or logic implementation(s) for the various logic and/or circuitry described herein. For example, in one embodiment the hardware description language may comply or be compatible with a very high speed integrated circuits (VHSIC) hardware description language (VHDL) that may enable semiconductor fabrication of one or more circuits and/or logic described herein. The VHDL may comply or be compatible with IEEE Standard 1076-1987, IEEE Standard 1076.2, IEEE1076.1, IEEE Draft 3.0 of VHDL-2006, IEEE Draft 4.0 of VHDL-2008 and/or other versions of the IEEE VHDL standards and/or other hardware description standards.

Thus, whether a transceiver complies with transceiver regulations may be determined based, at least in part, on the location of the device that contains the transceiver. A compliant transceiver may then be enabled, i.e., configured to operate, and/or a noncompliant transceiver may be disabled.

EXAMPLES

Examples of the present disclosure include subject material such as a method, means for performing acts of the method, a device, or of an apparatus or system related to selecting a transceiver, as discussed below.

Example 1

According to this example there is provided an apparatus. The apparatus includes a device including at least one transceiver. The apparatus further includes transceiver selection logic to determine whether each of the at least one transceiver complies with transceiver regulations associated with a location of the device.

Example 2

This example includes the elements of example 1, wherein the transceiver selection logic is to determine the location of the device.

Example 3

This example includes the elements of example 1, wherein the transceiver selection logic is to disable operation of one of the at least one transceiver if the one transceiver is not compliant with the transceiver regulations or configure the one of the at least one transceiver if the one transceiver complies with the transceiver regulations.

Example 4

This example includes the elements of example 1, wherein the device includes a first transceiver and a second transceiver.

Example 5

This example includes the elements according to any one of examples 1 through 4, wherein the transceiver selection logic is to query at least one of a transceiver regulatory database and/or a local transceiver regulatory data store.

Example 6

This example includes the elements according to any one of examples 1 through 4, wherein the transceiver selection logic is to identify each of the at least one transceiver.

Example 7

This example includes the elements of example 4, wherein the device is a coordinator node and the first transceiver and the second transceiver are redundant.

Example 8

This example includes the elements according to any one of examples 1 through 4, wherein the transceiver selection logic is to determine an allowable operating frequency band for each of the at least one transceiver.

Example 9

This example includes the elements according to any one of examples 1 through 4, wherein the transceiver selection logic is to determine at least one allowable operating parameter for each of the at least one transceiver.

Example 10

This example includes the elements according to any one of examples 1 through 4, wherein the transceiver selection logic is to determine an associated operating frequency range for each of the at least one transceiver.

Example 11

This example includes the elements according to any one of examples 1 through 4, wherein the transceiver selection logic is to query each of the at least one transceiver to determine its associated operating frequency range.

Example 12

This example includes the elements according to any one of examples 1 through 4, wherein the transceiver selection logic is to query each of the at least one transceiver to determine an associated transceiver identifier.

Example 13

This example includes the elements according to any one of examples 1 through 4, wherein the transceiver selection logic is to utilize the associated transceiver identifier to query at least one of a transceiver regulatory database and/or a local transceiver regulatory data store to determine whether a transceiver operating frequency range is within an allowable frequency band for the location.

Example 14

This example includes the elements according to any one of examples 1 through 4, wherein the transceiver selection logic is to disable one of the at least one transceiver if the transceiver's operating frequency range is not within the allowable frequency band or is to configure one of the at least one transceiver if the transceiver's operating frequency range is within the allowable frequency band.

Example 15

This example includes the elements according to any one of examples 1 through 4, wherein the device includes a plurality of transceivers.

Example 16

This example includes the elements according to any one of examples 1 through 4, wherein a respective operating frequency range of each transceiver of the plurality of transceivers is within a respective allowable frequency band for a region.

Example 17

This example includes the elements according to any one of examples 1 through 4, wherein the transceiver selection logic is to select one transceiver of the plurality of transceivers, the selected transceiver compliant with transceiver regulations for the region.

Example 18

This example includes the elements of example 4, wherein the first transceiver and the second transceiver comply with the transceiver regulations for at least one of a region, a country and/or a subregion.

Example 19

This example includes the elements according to any one of examples 1 through 4, wherein the first transceiver and the second transceiver each operate over a respective frequency range.

Example 20

This example includes the elements according to any one of examples 1 through 4, wherein the respective frequency ranges are the same.

Example 21

This example includes the elements according to any one of examples 1 through 4, wherein the respective frequency ranges are not the same.

Example 22

This example includes the elements of example 21, wherein a first frequency range corresponds to a first device network and a second frequency range corresponds to a second device network.

Example 23

This example includes the elements of example 2, wherein the location of the device is determined based, at least in part, on at least one of data acquired from a global positioning system (GPS) source, a geolocation database and/or location information stored on the device.

Example 24

This example includes the elements of example 2, wherein the device includes a global positioning system (GPS) module, the GPS module to communicate with one or more GPS sources to determine the location of the device.

Example 25

This example includes the elements of example 2, wherein the device includes a network interface, the transceiver selection logic to determine the location of the device based, at least in part, on an address associated with the network interface.

Example 26

This example includes the elements according to any one of examples 1 through 4, wherein the device includes a plurality of transceiver modules and further includes coupling circuitry, the coupling circuitry to multiplex the plurality of transceivers.

Example 27

This example includes the elements of example 26, wherein the device further includes a processor, the plurality of transceiver modules coupled to the processor via a plurality of respective serial interfaces.

Example 28

This example includes the elements according to any one of examples 1 through 4, wherein the device further includes a secure store to store at least one transceiver operating parameter for each of the at least one transceiver.

Example 29

This example includes the elements according to any one of examples 1 through 4, wherein the device further includes an input/output (I/O) interface to couple a processor to at least one of a network interface, a GPS module and/or coupling circuitry.

Example 30

This example includes the elements of example 29, wherein the I/O interface is to communicate serially.

Example 31

This example includes the elements according to any one of examples 1 through 4, wherein the at least one transceiver is removable.

Example 32

This example includes the elements according to any one of examples 1 through 4, wherein the device further includes at least one universal asynchronous receiver transmitter (UART).

Example 33

This example includes the elements of example 32, wherein each of the at least one UART is to receive a respective one transceiver.

Example 34

This example includes the elements according to any one of examples 1 through 4, wherein the device further includes a device app.

Example 35

This example includes the elements of example 34, wherein the device app is to communicate with one or more other devices via the at least one transceiver.

Example 36

This example includes the elements according to any one of examples 1 through 4, wherein whether each of the at least one transceiver complies with transceiver regulations associated with the location of the device is determined at least one of, at a first deployment of the device, each time the device is activated, in response to a request from a management service, in response to detecting a change in location and/or in response to detecting a change in a transceiver operating parameter.

Example 37

This example includes the elements according to any one of examples 1 through 4, wherein the transceiver selection logic is further to report to a management service.

Example 38

This example includes the elements of example 37, wherein the report includes an indicator whether or not each of the at least one transceiver complies with transceiver regulations associated with the location of the device.

Example 39

This example includes the elements according to any one of examples 1 through 4, wherein the device includes a transceiver module, the transceiver module including a universal asynchronous receiver transmitter (UART) and one of the at least one transceiver.

Example 40

This example includes the elements of example 6, wherein identifying each of the at least one transceiver includes establishing a serial connection to a transceiver module, issuing a command and retrieving one or more of a transceiver identifier, a frequency range, a duty cycle and/or a maximum transmitter power value.

Example 41

This example includes the elements of example 2, wherein determining the location of the device includes determining whether a global positioning system (GPS) source is available, retrieving at least one of GPS latitude GPS longitude and/or altitude if the GPS sources available.

Example 42

This example includes the elements of example 3, wherein configuring the one of the at least one transceiver includes one or more of configuring an operating frequency range, configuring a maximum transmitter power and/or configuring a maximum duty cycle.

Example 43

According to this example there is provided a method. The method includes determining, by transceiver selection logic, whether each of at least one transceiver complies with transceiver regulations associated with a location of a device, the device including the at least one transceiver.

Example 44

This example includes the elements of example 43, further including determining, by the transceiver selection logic, the location of the device.

Example 45

This example includes the elements of example 43, further including disabling, by the transceiver selection logic, operation of one of the at least one transceiver if the one transceiver is not compliant with the transceiver regulations or configuring, by the transceiver selection logic, the one of the at least one transceiver if the one transceiver complies with the transceiver regulations.

Example 46

This example includes the elements of example 43, wherein the device includes a first transceiver and a second transceiver

Example 47

This example includes the elements of example 43, further including querying, by the transceiver selection logic, at least one of a transceiver regulatory database and/or a local transceiver regulatory data store.

Example 48

This example includes the elements of example 43, further including identifying, by the transceiver selection logic, each of the at least one transceiver.

Example 49

This example includes the elements of example 46, wherein the device is a coordinator node and the first transceiver and the second transceiver are redundant.

Example 50

This example includes the elements of example 43, further including determining, by the transceiver selection logic, an allowable operating frequency band for each of the at least one transceiver.

Example 51

This example includes the elements of example 43, further including determining, by the transceiver selection logic, at least one allowable operating parameter for each of the at least one transceiver.

Example 52

This example includes the elements of example 43, further including determining, by the transceiver selection logic, an associated operating frequency range for each of the at least one transceiver.

Example 53

This example includes the elements of example 52, further including querying, by the transceiver selection logic, each of the at least one transceiver to determine its associated operating frequency range.

Example 54

This example includes the elements of example 43, further including querying, by the transceiver selection logic, each of the at least one transceiver to determine an associated transceiver identifier.

Example 55

This example includes the elements of example 54, further including utilizing, by the transceiver selection logic, the associated transceiver identifier to query at least one of a transceiver regulatory database and/or a local transceiver regulatory data store to determine whether a transceiver operating frequency range is within an allowable frequency band for the location.

Example 56

This example includes the elements of example 55, further including disabling, by the transceiver selection logic, one of the at least one transceiver if the transceiver's operating frequency range is not within the allowable frequency band or configuring, by the transceiver selection logic, one of the at least one transceiver if the transceiver's operating frequency range is within the allowable frequency band.

Example 57

This example includes the elements of example 43, wherein the device includes a plurality of transceivers.

Example 58

This example includes the elements of example 57, wherein a respective operating frequency range of each transceiver of the plurality of transceivers is within a respective allowable frequency band for a region.

Example 59

This example includes the elements of example 58, further including selecting, by the transceiver selection logic, one transceiver of the plurality of transceivers, the selected transceiver compliant with transceiver regulations for the region.

Example 60

This example includes the elements of example 46, wherein the first transceiver and the second transceiver comply with the transceiver regulations for at least one of a region, a country and/or a subregion.

Example 61

This example includes the elements of example 60, wherein the first transceiver and the second transceiver each operate over a respective frequency range.

Example 62

This example includes the elements of example 61, wherein the respective frequency ranges are the same.

Example 63

This example includes the elements of example 61, wherein the respective frequency ranges are not the same.

Example 64

This example includes the elements of example 63, wherein a first frequency range corresponds to a first device network and a second frequency range corresponds to a second device network.

Example 65

This example includes the elements of example 44, further including determining, by the transceiver selection logic, the location of the device based, at least in part, on at least one of data acquired from a global positioning system (GPS) source, a geolocation database and/or location information stored on the device.

Example 66

This example includes the elements of example 44, further including communicating, by a global positioning system (GPS) module, with one or more GPS sources to determine the location of the device.

Example 67

This example includes the elements of example 44, wherein the device includes a network interface and further including determining, by the transceiver selection logic, the location of the device based, at least in part, on an address associated with the network interface.

Example 68

This example includes the elements of example 43, wherein the device includes a plurality of transceiver modules and includes coupling circuitry, and further including multiplexing, by the coupling circuitry, the plurality of transceivers.

Example 69

This example includes the elements of example 68, wherein the device further includes a processor, the plurality of transceiver modules coupled to the processor via a plurality of respective serial interfaces.

Example 70

This example includes the elements of example 43, wherein the device further includes a secure store to store at least one transceiver operating parameter for each of the at least one transceiver.

Example 71

This example includes the elements of example 43, further including coupling, by an input/output (I/O) interface, a processor to at least one of a network interface, a GPS module and/or coupling circuitry.

Example 72

This example includes the elements of example 71, wherein the I/O interface is to communicate serially.

Example 73

This example includes the elements of example 43, wherein the at least one transceiver is removable.

Example 74

This example includes the elements of example 43, wherein the device further includes at least one universal asynchronous receiver transmitter (UART).

Example 75

This example includes the elements of example 74, wherein each of the at least one UART is to receive a respective one transceiver.

Example 76

This example includes the elements of example 43, wherein each device further includes a device app.

Example 77

This example includes the elements of example 76, further including communicating, by the device app, with one or more other devices via the at least one transceiver.

Example 78

This example includes the elements of example 43, wherein whether each of the at least one transceiver complies with transceiver regulations associated with the location of each device is determined at least one of, at a first deployment of the respective device, each time the respective device is activated, in response to a request from a management service, in response to detecting a change in location of the respective device and/or in response to detecting a change in a transceiver operating parameter of the respective device.

Example 79

This example includes the elements of example 43, further including reporting, by the transceiver selection logic, to the management service.

Example 80

This example includes the elements of example 79, including reporting, by the transceiver selection logic, whether or not each of the at least one transceiver complies with transceiver regulations associated with the location of the device.

Example 81

This example includes the elements of example 43, wherein the device includes a transceiver module, the transceiver module including a universal asynchronous receiver transmitter (UART) and one of the at least one transceiver.

Example 82

This example includes the elements of example 48, wherein identifying each of the at least one transceiver includes establishing a serial connection to a transceiver module, issuing a command and retrieving one or more of a transceiver identifier, a frequency range, a duty cycle and/or a maximum transmitter power value.

Example 83

This example includes the elements of example 44, wherein determining the location of the device includes determining whether a global positioning system (GPS) source is available, retrieving at least one of GPS latitude GPS longitude and/or altitude if the GPS sources available.

Example 84

This example includes the elements of example 45, wherein configuring the one of the at least one transceiver includes one or more of configuring an operating frequency range, configuring a maximum transmitter power and/or configuring a maximum duty cycle.

Example 85

This example includes the elements of example 43, wherein the device is one of a plurality of devices included in a device network.

Example 86

This example includes the elements of example 85, wherein the device network is a mesh network.

Example 87

This example includes the elements of example 86, wherein one device of the plurality of devices is a coordinator node, further including communicating, by the coordinator node, information between the management service and one or more other devices of the plurality of devices.

Example 88

This example includes the elements of example 85, wherein the device network is stationary.

Example 89

This example includes the elements of example 85, wherein the device network is mobile.

Example 90

This example includes the elements of example 43, wherein the management service includes a local transceiver regulatory data store.

Example 91

This example includes the elements of example 90, further including storing, by the local transceiver regulatory data store, transceiver regulatory data related to location for one or more of the plurality of devices.

Example 92

This example includes the elements of example 90, including storing, by the local transceiver regulatory data store, at least a subset of transceiver regulatory information stored in a transceiver regulatory database.

Example 93

This example includes the elements of example 92, wherein the transceiver regulatory information includes an allowable operating frequency band, one or more frequency sub bands and one or more allowable transceiver configuration parameter values associated with at least one of the allowable operating frequency band and/or the one or more frequency sub bands.

Example 94

This example includes the elements of example 92, further including utilizing, by one or more of the plurality of devices, at least one of the transceiver regulatory database and/or the local transceiver regulatory data store to determine whether a selected transceiver complies with transceiver regulations for the location.

Example 95

This example includes the elements of example 92, further including utilizing, by one or more of the plurality of devices, the transceiver regulatory database to determine one or more allowable operating parameter values associated with an allowable operating frequency band.

Example 96

This example includes the elements of example 95, wherein an allowable operating parameter is selected from the group including allowable transmitter power level, duty cycle, modulation scheme, type of antenna, height of antenna and/or an operating location constraint.

Example 97

This example includes the elements of example 96, wherein the allowable operating parameters include a plurality of transmitter power levels, each power level related to one or more of type of antenna, height of antenna, and/or operating location.

Example 98

This example includes the elements of example 92, wherein the transceiver regulatory database includes one or more transceiver identifiers, each transceiver identifier associated with at least one of a frequency band and/or a transceiver operating parameter value that correspond to compliance with the transceiver regulations for a specified location.

Example 99

This example includes the elements of example 43, wherein the management service further includes a device data store, the device data store to store device information.

Example 100

This example includes the elements of example 99, wherein the device information includes one or more of device characteristic information for each device and/or deployment information for each device.

Example 101

This example includes the elements of example 100, wherein the device characteristic information includes one or more of a device model identifier, a transceiver identifier, a transceiver type, an operating frequency range, a maximum transmitter power and/or an antenna characteristic.

Example 102

This example includes the elements of example 100, wherein the deployment information includes one or more of a device model identifier, a transceiver identifier for each of the at least one transceiver, an indicator whether each transceiver complies with the deployment location for the device, a configuration parameter for each transceiver and/or an indicator whether each transceiver is enabled or disabled.

Example 103

This example includes the elements of example 102, wherein the deployment information is updated at least one of periodically and/or intermittently, in response to a report from one or more device(s) of the plurality of devices.

Example 104

According to this example there is provided a system. The system includes a management service; and a plurality of devices. Each device includes at least one transceiver; and transceiver selection logic to determine whether each of the at least one transceiver complies with transceiver regulations associated with a location of the device.

Example 105

This example includes the elements of example 104, wherein the transceiver selection logic is to determine the location of the device.

Example 106

This example includes the elements of example 104, wherein the transceiver selection logic is to disable operation of one of the at least one transceiver if the one transceiver is not compliant with the transceiver regulations or configure the one of the at least one transceiver if the one transceiver complies with the transceiver regulations.

Example 107

This example includes the elements of example 104, wherein each device includes a first transceiver and a second transceiver.

Example 108

This example includes the elements according to any one of examples 104 through 107, wherein the management service includes a local transceiver regulatory data store and the transceiver selection logic is to query at least one of a transceiver regulatory database and/or the local transceiver regulatory data store.

Example 109

This example includes the elements according to any one of examples 104 through 107, wherein the transceiver selection logic is to identify each of the at least one transceiver.

Example 110

This example includes the elements of example 107, wherein one device of the plurality of devices is a coordinator node and the first transceiver and the second transceiver are redundant in the one device.

Example 111

This example includes the elements according to any one of examples 104 through 107, wherein the transceiver selection logic is to determine an allowable operating frequency band for each of the at least one transceiver.

Example 112

This example includes the elements according to any one of examples 104 through 107, wherein the transceiver selection logic is to determine at least one allowable operating parameter for each of the at least one transceiver.

Example 113

This example includes the elements according to any one of examples 104 through 107, wherein the transceiver selection logic is to determine an associated operating frequency range for each of the at least one transceiver.

Example 114

This example includes the elements of example 113, wherein the transceiver selection logic is to query each of the at least one transceiver to determine its associated operating frequency range.

Example 115

This example includes the elements according to any one of examples 104 through 107, wherein the transceiver selection logic is to query each of the at least one transceiver to determine an associated transceiver identifier.

Example 116

This example includes the elements of example 115, wherein the transceiver selection logic is to utilize the associated transceiver identifier to query at least one of a transceiver regulatory database and/or a local transceiver regulatory data store to determine whether a transceiver operating frequency range is within an allowable frequency band for the location.

Example 117

This example includes the elements of example 116, wherein the transceiver selection logic is to disable one of the at least one transceiver if the transceiver's operating frequency range is not within the allowable frequency band or is to configure one of the at least one transceiver if the transceiver's operating frequency range is within the allowable frequency band.

Example 118

This example includes the elements according to any one of examples 104 through 107, wherein each device includes a plurality of transceivers.

Example 119

This example includes the elements of example 118, wherein a respective operating frequency range of each transceiver of the plurality of transceivers is within a respective allowable frequency band for a region.

Example 120

This example includes the elements of example 119, wherein the transceiver selection logic is to select one transceiver of the plurality of transceivers, the selected transceiver compliant with transceiver regulations for the region.

Example 121

This example includes the elements of example 107, wherein the first transceiver and the second transceiver comply with the transceiver regulations for at least one of a region, a country and/or a subregion.

Example 122

This example includes the elements of example 121, wherein the first transceiver and the second transceiver each operate over a respective frequency range.

Example 123

This example includes the elements of example 122, wherein the respective frequency ranges are the same.

Example 124

This example includes the elements of example 122, wherein the respective frequency ranges are not the same.

Example 125

This example includes the elements of example 124, wherein a first frequency range corresponds to a first device network and a second frequency range corresponds to a second device network.

Example 126

This example includes the elements of example 105, wherein the location of the device is determined based, at least in part, on at least one of data acquired from a global positioning system (GPS) source, a geolocation database and/or location information stored on the device.

Example 127

This example includes the elements of example 105, wherein each device includes a global positioning system (GPS) module, the GPS module to communicate with one or more GPS sources to determine the location of the device.

Example 128

This example includes the elements of example 105, wherein each device includes a network interface, the transceiver selection logic to determine the location of the device based, at least in part, on an address associated with the network interface.

Example 129

This example includes the elements according to any one of examples 104 through 107, wherein each device includes a plurality of transceiver modules and further includes coupling circuitry, the coupling circuitry to multiplex the plurality of transceivers.

Example 130

This example includes the elements of example 129, wherein each device further includes a processor, the plurality of transceiver modules coupled to the processor via a plurality of respective serial interfaces.

Example 131

This example includes the elements according to any one of examples 104 through 107, wherein each device further includes a secure store to store at least one transceiver operating parameter for each of the at least one transceiver.

Example 132

This example includes the elements according to any one of examples 104 through 107, wherein each device further includes an input/output (I/O) interface to couple a processor to at least one of a network interface, a GPS module and/or coupling circuitry.

Example 133

This example includes the elements of example 132, wherein the I/O interface is to communicate serially.

Example 134

This example includes the elements according to any one of examples 104 through 107, wherein the at least one transceiver is removable.

Example 135

This example includes the elements according to any one of examples 104 through 107, wherein each device further includes at least one universal asynchronous receiver transmitter (UART).

Example 136

This example includes the elements of example 135, wherein each of the at least one UART is to receive a respective one transceiver.

Example 137

This example includes the elements according to any one of examples 104 through 107, wherein each device further includes a device app.

Example 138

This example includes the elements of example 137, wherein the device app is to communicate with one or more other devices via the at least one transceiver.

Example 139

This example includes the elements according to any one of examples 104 through 107, wherein whether each of the at least one transceiver complies with transceiver regulations associated with the location of each device is determined at least one of, at a first deployment of the respective device, each time the respective device is activated, in response to a request from a management service, in response to detecting a change in location of the respective device and/or in response to detecting a change in a transceiver operating parameter of the respective device.

Example 140

This example includes the elements according to any one of examples 104 through 107, wherein the transceiver selection logic is further to report to the management service.

Example 141

This example includes the elements of example 140, wherein the report includes an indicator whether or not each of the at least one transceiver complies with transceiver regulations associated with the location of the device.

Example 142

This example includes the elements according to any one of examples 104 through 107, wherein each device includes a transceiver module, the transceiver module including a universal asynchronous receiver transmitter (UART) and one of the at least one transceiver.

Example 143

This example includes the elements of example 109, wherein identifying each of the at least one transceiver includes establishing a serial connection to a transceiver module, issuing a command and retrieving one or more of a transceiver identifier, a frequency range, a duty cycle and/or a maximum transmitter power value.

Example 144

This example includes the elements of example 105, wherein determining the location of the device includes determining whether a global positioning system (GPS) source is available, retrieving at least one of GPS latitude GPS longitude and/or altitude if the GPS sources available.

Example 145

This example includes the elements of example 106, wherein configuring the one of the at least one transceiver includes one or more of configuring an operating frequency range, configuring a maximum transmitter power and/or configuring a maximum duty cycle.

Example 146

This example includes the elements according to any one of examples 104 through 107, wherein the plurality of devices is included in a device network.

Example 147

This example includes the elements of example 146, wherein the device network is a mesh network.

Example 148

This example includes the elements of example 147, wherein one device of the plurality of devices is a coordinator node, the coordinator node to communicate information between the management service and one or more other devices of the plurality of devices.

Example 149

This example includes the elements of example 146, wherein the device network is stationary.

Example 150

This example includes the elements of example 146, wherein the device network is mobile.

Example 151

This example includes the elements according to any one of examples 104 through 107, wherein the management service includes a local transceiver regulatory data store.

Example 152

This example includes the elements of example 151, wherein the local transceiver regulatory data store is to store transceiver regulatory data related to location for one or more of the plurality of devices.

Example 153

This example includes the elements of example 151, wherein the local transceiver regulatory data store is to store at least a subset of transceiver regulatory information stored in a transceiver regulatory database.

Example 154

This example includes the elements of example 153, wherein the transceiver regulatory information includes an allowable operating frequency band, one or more frequency sub bands and one or more allowable transceiver configuration parameter values associated with at least one of the allowable operating frequency band and/or the one or more frequency sub bands.

Example 155

This example includes the elements of example 153 wherein one or more of the plurality of devices is to utilize at least one of the transceiver regulatory database and/or the local transceiver regulatory data store to determine whether a selected transceiver complies with transceiver regulations for the location.

Example 156

This example includes the elements of example 153, wherein one or more of the plurality of devices is to utilize the transceiver regulatory database to determine one or more allowable operating parameter values associated with an allowable operating frequency band.

Example 157

This example includes the elements of example 156, wherein an allowable operating parameter is selected from the group including allowable transmitter power level, duty cycle, modulation scheme, type of antenna, height of antenna and/or an operating location constraint.

Example 158

This example includes the elements of example 157, wherein the allowable operating parameters include a plurality of transmitter power levels, each power level related to one or more of type of antenna, height of antenna, and/or operating location.

Example 159

This example includes the elements of example 153, wherein the transceiver regulatory database includes one or more transceiver identifiers, each transceiver identifier associated with at least one of a frequency band and/or a transceiver operating parameter value that correspond to compliance with the transceiver regulations for a specified location.

Example 160

This example includes the elements according to any one of examples 104 through 107, wherein the management service further includes a device data store, the device data store to store device information.

Example 161

This example includes the elements of example 160, wherein the device information includes one or more of device characteristic information for each device and/or deployment information for each device.

Example 162

This example includes the elements of example 161, wherein the device characteristic information includes one or more of a device model identifier, a transceiver identifier, a transceiver type, an operating frequency range, a maximum transmitter power and/or an antenna characteristic.

Example 163

This example includes the elements of example 161, wherein the deployment information includes one or more of a device model identifier, a transceiver identifier for each of the at least one transceiver, an indicator whether each transceiver complies with the deployment location for the device, a configuration parameter for each transceiver and/or an indicator whether each transceiver is enabled or disabled.

Example 164

This example includes the elements of example 163, wherein the deployment information is updated at least one of periodically and/or intermittently, in response to a report from one or more device(s) of the plurality of devices.

Example 165

A computer readable storage device having stored thereon instructions that when executed by one or more processors result in the following operations including determining whether each of at least one transceiver complies with transceiver regulations associated with a location of a device, the device including the at least one transceiver.

Example 166

This example includes the elements of example 165, wherein the instructions that when executed by one or more processors results in the following additional operations including determining the location of the device.

Example 167

This example includes the elements of example 165, wherein the instructions that when executed by one or more processors results in the following additional operations including disabling operation of one of the at least one transceiver if the one transceiver is not compliant with the transceiver regulations or configuring, by the transceiver selection logic, the one of the at least one transceiver if the one transceiver complies with the transceiver regulations.

Example 168

This example includes the elements of example 165, wherein the device includes a first transceiver and a second transceiver Example 169

This example includes the elements according to any one of examples 165 through 168, wherein the instructions that when executed by one or more processors results in the following additional operations including querying at least one of a transceiver regulatory database and/or a local transceiver regulatory data store.

Example 170

This example includes the elements according to any one of examples 165 through 168, wherein the instructions that when executed by one or more processors results in the following additional operations including identifying each of the at least one transceiver.

Example 171

This example includes the elements of example 168, wherein the device is a coordinator node and the first transceiver and the second transceiver are redundant.

Example 172

This example includes the elements according to any one of examples 165 through 168, wherein the instructions that when executed by one or more processors results in the following additional operations including determining an allowable operating frequency band for each of the at least one transceiver.

Example 173

This example includes the elements according to any one of examples 165 through 168, wherein the instructions that when executed by one or more processors results in the following additional operations including determining at least one allowable operating parameter for each of the at least one transceiver.

Example 174

This example includes the elements according to any one of examples 165 through 168, wherein the instructions that when executed by one or more processors results in the following additional operations including determining an associated operating frequency range for each of the at least one transceiver.

Example 175

This example includes the elements of example 174, wherein the instructions that when executed by one or more processors results in the following additional operations including querying each of the at least one transceiver to determine its associated operating frequency range.

Example 176

This example includes the elements according to any one of examples 165 through 168, wherein the instructions that when executed by one or more processors results in the following additional operations including querying each of the at least one transceiver to determine an associated transceiver identifier.

Example 177

This example includes the elements of example 176, wherein the instructions that when executed by one or more processors results in the following additional operations including utilizing the associated transceiver identifier to query at least one of a transceiver regulatory database and/or a local transceiver regulatory data store to determine whether a transceiver operating frequency range is within an allowable frequency band for the location.

Example 178

This example includes the elements of example 177, wherein the instructions that when executed by one or more processors results in the following additional operations including disabling one of the at least one transceiver if the transceiver's operating frequency range is not within the allowable frequency band or configuring, by the transceiver selection logic, one of the at least one transceiver if the transceiver's operating frequency range is within the allowable frequency band.

Example 179

This example includes the elements according to any one of examples 165 through 168, wherein the device includes a plurality of transceivers.

Example 180

This example includes the elements of example 179, wherein a respective operating frequency range of each transceiver of the plurality of transceivers is within a respective allowable frequency band for a region.

Example 181

This example includes the elements of example 180, wherein the instructions that when executed by one or more processors results in the following additional operations including selecting one transceiver of the plurality of transceivers, the selected transceiver compliant with transceiver regulations for the region.

Example 182

This example includes the elements of example 168, wherein the first transceiver and the second transceiver comply with the transceiver regulations for at least one of a region, a country and/or a subregion.

Example 183

This example includes the elements of example 182, wherein the first transceiver and the second transceiver each operate over a respective frequency range.

Example 184

This example includes the elements of example 183, wherein the respective frequency ranges are the same.

Example 185

This example includes the elements of example 183, wherein the respective frequency ranges are not the same.

Example 186

This example includes the elements of example 185, wherein a first frequency range corresponds to a first device network and a second frequency range corresponds to a second device network.

Example 187

This example includes the elements of example 166, wherein the instructions that when executed by one or more processors results in the following additional operations including determining the location of the device based, at least in part, on at least one of data acquired from a global positioning system (GPS) source, a geolocation database and/or location information stored on the device.

Example 188

This example includes the elements of example 166, wherein the instructions that when executed by one or more processors results in the following additional operations including communicating with one or more GPS sources to determine the location of the device.

Example 189

This example includes the elements of example 166, wherein the instructions that when executed by one or more processors results in the following additional operations including determining, by transceiver selection logic, the location of the device based, at least in part, on an address associated with a network interface.

Example 190

This example includes the elements according to any one of examples 165 through 168, wherein the device includes a plurality of transceiver modules and includes coupling circuitry, and further including multiplexing, by coupling circuitry, the plurality of transceivers.

Example 191

This example includes the elements of example 190, wherein the device further includes a processor, the plurality of transceiver modules coupled to the processor via a plurality of respective serial interfaces.

Example 192

This example includes the elements according to any one of examples 165 through 168, wherein the device further includes a secure store to store at least one transceiver operating parameter for each of the at least one transceiver.

Example 193

This example includes the elements according to any one of examples 165 through 168, wherein the instructions that when executed by one or more processors results in the following additional operations including coupling a processor to at least one of a network interface, a GPS module and/or coupling circuitry.

Example 194

This example includes the elements of example 193, wherein the 110 interface is to communicate serially.

Example 195

This example includes the elements according to any one of examples 165 through 168, wherein the at least one transceiver is removable.

Example 196

This example includes the elements according to any one of examples 165 through 168, wherein the device further includes at least one universal asynchronous receiver transmitter (UART).

Example 197

This example includes the elements of example 196, wherein each of the at least one UART is to receive a respective one transceiver.

Example 198

This example includes the elements according to any one of examples 165 through 168, wherein each device further includes a device app.

Example 199

This example includes the elements of example 198, wherein the instructions that when executed by one or more processors results in the following additional operations including communicating with one or more other devices via the at least one transceiver.

Example 200

This example includes the elements according to any one of examples 165 through 168, wherein whether each of the at least one transceiver complies with transceiver regulations associated with the location of each device is determined at least one of, at a first deployment of the respective device, each time the respective device is activated, in response to a request from a management service, in response to detecting a change in location of the respective device and/or in response to detecting a change in a transceiver operating parameter of the respective device.

Example 201

This example includes the elements according to any one of examples 165 through 168, wherein the instructions that when executed by one or more processors results in the following additional operations including reporting to the management service.

Example 202

This example includes the elements of example 201, including reporting, by transceiver selection logic, whether or not each of the at least one transceiver complies with transceiver regulations associated with the location of the device.

Example 203

This example includes the elements according to any one of examples 165 through 168, wherein the device includes a transceiver module, the transceiver module including a universal asynchronous receiver transmitter (UART) and one of the at least one transceiver.

Example 204

This example includes the elements of example 170, wherein identifying each of the at least one transceiver includes establishing a serial connection to a transceiver module, issuing a command and retrieving one or more of a transceiver identifier, a frequency range, a duty cycle and/or a maximum transmitter power value.

Example 205

This example includes the elements of example 166, wherein determining the location of the device includes determining whether a global positioning system (GPS) source is available, retrieving at least one of GPS latitude GPS longitude and/or altitude if the GPS sources available.

Example 206

This example includes the elements of example 167, wherein configuring the one of the at least one transceiver includes one or more of configuring an operating frequency range, configuring a maximum transmitter power and/or configuring a maximum duty cycle.

Example 207

This example includes the elements according to any one of examples 165 through 168, wherein the device is one of a plurality of devices included in a device network.

Example 208

This example includes the elements of example 207, wherein the device network is a mesh network.

Example 209

This example includes the elements of example 208, wherein one device of the plurality of devices is a coordinator node, further including communicating, by the coordinator node, information between the management service and one or more other devices of the plurality of devices.

Example 210

This example includes the elements of example 207, wherein the device network is stationary.

Example 211

This example includes the elements of example 207, wherein the device network is mobile.

Example 212

This example includes the elements according to any one of examples 165 through 168, wherein the management service includes a local transceiver regulatory data store.

Example 213

This example includes the elements of example 212, wherein the instructions that when executed by one or more processors results in the following additional operations including storing transceiver regulatory data related to location for one or more of the plurality of devices.

Example 214

This example includes the elements of example 212, including storing, by the local transceiver regulatory data store, at least a subset of transceiver regulatory information stored in a transceiver regulatory database.

Example 215

This example includes the elements of example 214, wherein the transceiver regulatory information includes an allowable operating frequency band, one or more frequency sub bands and one or more allowable transceiver configuration parameter values associated with at least one of the allowable operating frequency band and/or the one or more frequency sub bands.

Example 216

This example includes the elements of example 214, wherein the instructions that when executed by one or more processors results in the following additional operations including utilizing at least one of the transceiver regulatory database and/or the local transceiver regulatory data store to determine whether a selected transceiver complies with transceiver regulations for the location.

Example 217

This example includes the elements of example 214, wherein the instructions that when executed by one or more processors results in the following additional operations including utilizing the transceiver regulatory database to determine one or more allowable operating parameter values associated with an allowable operating frequency band.

Example 218

This example includes the elements of example 217, wherein an allowable operating parameter is selected from the group including allowable transmitter power level, duty cycle, modulation scheme, type of antenna, height of antenna and/or an operating location constraint.

Example 219

This example includes the elements of example 218, wherein the allowable operating parameters include a plurality of transmitter power levels, each power level related to one or more of type of antenna, height of antenna, and/or operating location.

Example 220

This example includes the elements of example 214, wherein the transceiver regulatory database includes one or more transceiver identifiers, each transceiver identifier associated with at least one of a frequency band and/or a transceiver operating parameter value that correspond to compliance with the transceiver regulations for a specified location.

Example 221

This example includes the elements according to any one of examples 165 through 168, wherein the management service further includes a device data store, the device data store to store device information.

Example 222

This example includes the elements of example 221, wherein the device information includes one or more of device characteristic information for each device and/or deployment information for each device.

Example 223

This example includes the elements of example 222, wherein the device characteristic information includes one or more of a device model identifier, a transceiver identifier, a transceiver type, an operating frequency range, a maximum transmitter power and/or an antenna characteristic.

Example 224

This example includes the elements of example 222, wherein the deployment information includes one or more of a device model identifier, a transceiver identifier for each of the at least one transceiver, an indicator whether each transceiver complies with the deployment location for the device, a configuration parameter for each transceiver and/or an indicator whether each transceiver is enabled or disabled.

Example 225

This example includes the elements of example 224, wherein the deployment information is updated at least one of periodically and/or intermittently, in response to a report from one or more device(s) of the plurality of devices.

Example 226

According to this example there is provided a device. The device includes means for determining, by transceiver selection logic, whether each of at least one transceiver complies with transceiver regulations associated with a location of a device, the device including the at least one transceiver.

Example 227

This example includes the elements of example 226, further including means for determining, by the transceiver selection logic, the location of the device.

Example 228

This example includes the elements of example 226, further including means for disabling, by the transceiver selection logic, operation of one of the at least one transceiver if the one transceiver is not compliant with the transceiver regulations or configuring, by the transceiver selection logic, the one of the at least one transceiver if the one transceiver complies with the transceiver regulations.

Example 229

This example includes the elements of example 226, wherein the device includes a first transceiver and a second transceiver

Example 230

This example includes the elements according to any one of examples 226 through 229, further including means for querying, by the transceiver selection logic, at least one of a transceiver regulatory database and/or a local transceiver regulatory data store.

Example 231

This example includes the elements according to any one of examples 226 through 229, further including means for identifying, by the transceiver selection logic, each of the at least one transceiver.

Example 232

This example includes the elements of example 229, wherein the device is a coordinator node and the first transceiver and the second transceiver are redundant.

Example 233

This example includes the elements according to any one of examples 226 through 229, further including means for determining, by the transceiver selection logic, an allowable operating frequency band for each of the at least one transceiver.

Example 234

This example includes the elements according to any one of examples 226 through 229, further including means for determining, by the transceiver selection logic, at least one allowable operating parameter for each of the at least one transceiver.

Example 235

This example includes the elements according to any one of examples 226 through 229, further including means for determining, by the transceiver selection logic, an associated operating frequency range for each of the at least one transceiver.

Example 236

This example includes the elements of example 235, further including means for querying, by the transceiver selection logic, each of the at least one transceiver to determine its associated operating frequency range.

Example 237

This example includes the elements according to any one of examples 226 through 229, further including means for querying, by the transceiver selection logic, each of the at least one transceiver to determine an associated transceiver identifier.

Example 238

This example includes the elements of example 237, further including means for utilizing, by the transceiver selection logic, the associated transceiver identifier to query at least one of a transceiver regulatory database and/or a local transceiver regulatory data store to determine whether a transceiver operating frequency range is within an allowable frequency band for the location.

Example 239

This example includes the elements of example 238, further including means for disabling, by the transceiver selection logic, one of the at least one transceiver if the transceiver's operating frequency range is not within the allowable frequency band or configuring, by the transceiver selection logic, one of the at least one transceiver if the transceiver's operating frequency range is within the allowable frequency band.

Example 240

This example includes the elements according to any one of examples 226 through 229, wherein the device includes a plurality of transceivers.

Example 241

This example includes the elements of example 240, wherein a respective operating frequency range of each transceiver of the plurality of transceivers is within a respective allowable frequency band for a region.

Example 242

This example includes the elements of example 241, further including means for selecting, by the transceiver selection logic, one transceiver of the plurality of transceivers, the selected transceiver compliant with transceiver regulations for the region.

Example 243

This example includes the elements of example 229, wherein the first transceiver and the second transceiver comply with the transceiver regulations for at least one of a region, a country and/or a subregion.

Example 244

This example includes the elements of example 243, wherein the first transceiver and the second transceiver each operate over a respective frequency range.

Example 245

This example includes the elements of example 244, wherein the respective frequency ranges are the same.

Example 246

This example includes the elements of example 244, wherein the respective frequency ranges are not the same.

Example 247

This example includes the elements of example 246, wherein a first frequency range corresponds to a first device network and a second frequency range corresponds to a second device network.

Example 248

This example includes the elements of example 227, further including means for determining, by the transceiver selection logic, the location of the device based, at least in part, on at least one of data acquired from a global positioning system (GPS) source, a geolocation database and/or location information stored on the device.

Example 249

This example includes the elements of example 227, further including means for communicating, by a global positioning system (GPS) module, with one or more GPS sources to determine the location of the device.

Example 250

This example includes the elements of example 227, wherein the device includes a network interface and further including determining, by the transceiver selection logic, the location of the device based, at least in part, on an address associated with the network interface.

Example 251

This example includes the elements according to any one of examples 226 through 229, wherein the device includes a plurality of transceiver modules and includes coupling circuitry, and further including multiplexing, by the coupling circuitry, the plurality of transceivers.

Example 252

This example includes the elements of example 251, wherein the device further includes a processor, the plurality of transceiver modules coupled to the processor via a plurality of respective serial interfaces.

Example 253

This example includes the elements according to any one of examples 226 through 229, wherein the device further includes a secure store to store at least one transceiver operating parameter for each of the at least one transceiver.

Example 254

This example includes the elements according to any one of examples 226 through 229, further including means for coupling, by an input/output (I/O) interface, a processor to at least one of a network interface, a GPS module and/or coupling circuitry.

Example 255

This example includes the elements of example 254, wherein the I/O interface is to communicate serially.

Example 256

This example includes the elements according to any one of examples 226 through 229, wherein the at least one transceiver is removable.

Example 257

This example includes the elements according to any one of examples 226 through 229, wherein the device further includes at least one universal asynchronous receiver transmitter (UART).

Example 258

This example includes the elements of example 257, wherein each of the at least one UART is to receive a respective one transceiver.

Example 259

This example includes the elements according to any one of examples 226 through 229, wherein each device further includes a device app.

Example 260

This example includes the elements of example 259, further including means for communicating, by the device app, with one or more other devices via the at least one transceiver.

Example 261

This example includes the elements according to any one of examples 226 through 229, wherein whether each of the at least one transceiver complies with transceiver regulations associated with the location of each device is determined at least one of, at a first deployment of the respective device, each time the respective device is activated, in response to a request from a management service, in response to detecting a change in location of the respective device and/or in response to detecting a change in a transceiver operating parameter of the respective device.

Example 262

This example includes the elements according to any one of examples 226 through 229, further including means for reporting, by the transceiver selection logic, to the management service.

Example 263

This example includes the elements of example 262, including reporting, by the transceiver selection logic, whether or not each of the at least one transceiver complies with transceiver regulations associated with the location of the device.

Example 264

This example includes the elements according to any one of examples 226 through 229, wherein the device includes a transceiver module, the transceiver module including a universal asynchronous receiver transmitter (UART) and one of the at least one transceiver.

Example 265

This example includes the elements of example 231, wherein identifying each of the at least one transceiver includes establishing a serial connection to a transceiver module, issuing a command and retrieving one or more of a transceiver identifier, a frequency range, a duty cycle and/or a maximum transmitter power value.

Example 266

This example includes the elements of example 227, wherein determining the location of the device includes determining whether a global positioning system (GPS) source is available, retrieving at least one of GPS latitude GPS longitude and/or altitude if the GPS sources available.

Example 267

This example includes the elements of example 228, wherein configuring the one of the at least one transceiver includes one or more of configuring an operating frequency range, configuring a maximum transmitter power and/or configuring a maximum duty cycle.

Example 268

This example includes the elements according to any one of examples 226 through 229, wherein the device is one of a plurality of devices included in a device network.

Example 269

This example includes the elements of example 268, wherein the device network is a mesh network.

Example 270

This example includes the elements of example 269, wherein one device of the plurality of devices is a coordinator node, further including communicating, by the coordinator node, information between the management service and one or more other devices of the plurality of devices.

Example 271

This example includes the elements of example 268, wherein the device network is stationary.

Example 272

This example includes the elements of example 268, wherein the device network is mobile.

Example 273

This example includes the elements according to any one of examples 226 through 229, wherein the management service includes a local transceiver regulatory data store.

Example 274

This example includes the elements of example 273, further including means for storing, by the local transceiver regulatory data store, transceiver regulatory data related to location for one or more of the plurality of devices.

Example 275

This example includes the elements of example 273, including storing, by the local transceiver regulatory data store, at least a subset of transceiver regulatory information stored in a transceiver regulatory database.

Example 276

This example includes the elements of example 275, wherein the transceiver regulatory information includes an allowable operating frequency band, one or more frequency sub bands and one or more allowable transceiver configuration parameter values associated with at least one of the allowable operating frequency band and/or the one or more frequency sub bands.

Example 277

This example includes the elements of example 275, further including means for utilizing, by one or more of the plurality of devices, at least one of the transceiver regulatory database and/or the local transceiver regulatory data store to determine whether a selected transceiver complies with transceiver regulations for the location.

Example 278

This example includes the elements of example 275, further including means for utilizing, by one or more of the plurality of devices, the transceiver regulatory database to determine one or more allowable operating parameter values associated with an allowable operating frequency band.

Example 279

This example includes the elements of example 278, wherein an allowable operating parameter is selected from the group including allowable transmitter power level, duty cycle, modulation scheme, type of antenna, height of antenna and/or an operating location constraint.

Example 280

This example includes the elements of example 279, wherein the allowable operating parameters include a plurality of transmitter power levels, each power level related to one or more of type of antenna, height of antenna, and/or operating location.

Example 281

This example includes the elements of example 275, wherein the transceiver regulatory database includes one or more transceiver identifiers, each transceiver identifier associated with at least one of a frequency band and/or a transceiver operating parameter value that correspond to compliance with the transceiver regulations for a specified location.

Example 282

This example includes the elements according to any one of examples 226 through 229, wherein the management service further includes a device data store, the device data store to store device information.

Example 283

This example includes the elements of example 282, wherein the device information includes one or more of device characteristic information for each device and/or deployment information for each device.

Example 284

This example includes the elements of example 283, wherein the device characteristic information includes one or more of a device model identifier, a transceiver identifier, a transceiver type, an operating frequency range, a maximum transmitter power and/or an antenna characteristic.

Example 285

This example includes the elements of example 283, wherein the deployment information includes one or more of a device model identifier, a transceiver identifier for each of the at least one transceiver, an indicator whether each transceiver complies with the deployment location for the device, a configuration parameter for each transceiver and/or an indicator whether each transceiver is enabled or disabled.

Example 286

This example includes the elements of example 285, wherein the deployment information is updated at least one of periodically and/or intermittently, in response to a report from one or more device(s) of the plurality of devices.

Example 287

A system including at least one device arranged to perform the method of any one of examples 43 to 103.

Example 288

A device including means to perform the method of any one of examples 43 to 103.

Example 289

A computer readable storage device having stored thereon instructions that when executed by one or more processors result in the following operations including: the method according to any one of examples 43 through 103.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. An apparatus comprising:
   a device comprising:
      a plurality of transceivers; and
      transceiver selection circuitry to determine whether each of the plurality of transceivers complies with transceiver regulations associated with a location of the device, said transceiver regulations comprising at least one restriction related to duty cycle, transmitter power level, modulation scheme, antenna directionality, antenna height, allowable frequency band, or a combination thereof;
   wherein:
      when the transceiver selection circuitry determines that at least one of the plurality of transceivers does not comply with said transceiver regulations, the transceiver selection circuitry disables the at least one transceiver that does not comply with said transceiver regulations; and
      when the transceiver selection circuitry determines that at least one of the plurality of transceivers complies with said transceiver regulations, the transceiver selection circuitry configures the at least one transceiver of the plurality of transceivers that complies with said transceiver regulations.

2. The apparatus of claim 1, wherein the transceiver selection circuitry is to determine the location of the device.

3. The apparatus of claim 1, wherein said device further comprises a plurality of universal asynchronous receiver transmitters (UARTs), each of said plurality of UARTs including a respective one of said plurality of transceivers.

4. The apparatus of claim 1, wherein the transceiver selection circuitry configures the at least one transceiver that complies with said transceiver regulations at least in part by configuring a maximum duty cycle of the at least one transceiver that complies with said transceiver regulations.

5. The apparatus of claim 4, wherein the device is a coordinator node and the plurality of transceivers includes a first transceiver and a second transceiver that are redundant.

6. The apparatus of claim 1, wherein the transceiver selection circuitry is further to:
   query each of the plurality of tranceivers to determine a transceiver identifier for each of the plurality of transceivers; and
   determine whether each of the plurality of transceivers complies with transceiver regulations associated with a location of the device at least in part by querying at least one of a transceiver regulatory database and/or a local transceiver regulatory data store using the identifier for each of the plurality of transceivers.

7. The apparatus of claim 1, wherein the transceiver selection circuitry is further to determine whether each of said plurality of transceivers complies with said transceiver regulations: at a first deployment of the device; each time the device is activated; in response to a request from a management service; in response to detecting a change in location; in response to detecting a change in a transceiver operating parameter; or a combination of two or more thereof.

8. The apparatus of claim 1, wherein each of the plurality of transceivers is selected from the group consisting of a Wi-Fi transceiver, a low power wide area transceiver, a cellular modem, a wireless mesh network transceiver, a near field communication transceiver, or a combination thereof.

9. A method comprising:
   determining, by transceiver selection circuitry of a device comprising a plurality of transceivers, whether each of the plurality of transceivers complies with transceiver regulations associated with a location of the device, said transceiver regulations comprising at least one restriction related to duty cycle, transmitter power level, modulation scheme, antenna directionality, antenna height, allowable frequency band, or a combination thereof;
   when the transceiver selection circuitry determines that at least one of the plurality of transceivers does not comply with said transceiver regulations, disabling the at least one transceiver that does not comply with said transceiver regulations; and when the transceiver selection circuitry determines that at least one of the plurality of transceivers complies with said transceiver regulations, configuring the at least one transceiver that complies with the plurality of transceiver regulations.

10. The method of claim 9, further comprising determining, by the transceiver selection circuitry, the location of the device.

11. The method of claim 9, wherein said device further comprises a plurality of universal asynchronous receiver transmitter (UARTs), each of said plurality of UARTs including a respective one or said plurality of transceivers.

12. The method of claim 9, wherein the transceiver selection circuitry configures the at least one transceiver that complies with said transceiver regulations at least in part by configuring a maximum duty cycle of the at least one transceiver that complies with said transceiver regulations.

13. The method of claim 12, wherein the device is a coordinator node of a mesh network, and the plurality of transceivers includes a first transceiver and a second transceiver that are redundant.

14. The method of claim 9, wherein said determining comprises:
  querying, with the transceiver selection circuitry each of the plurality of transceivers to determine a transceiver identifier for each of the plurality of the transceivers; and
  querying, by the transceiver selection circuitry, at least one of a transceiver regulatory database and/or a local transceiver regulatory data store using the identifier for each of the plurality of transceivers.

15. The method of claim 9, wherein said determining is performed: at a first deployment of the device; each time the device is activated; in response to a request from a management service; in response to detecting a change in location; in response to detecting a change in a transceiver operating parameter; or a combination of two or more thereof.

16. The method of claim 9, wherein each of the plurality of transceivers is selected from the group consisting of a Wi-Fi transceiver, a low power wide area transceiver, a cellular modem, a wireless mesh network transceiver, a near field communication transceiver, or a combination thereof.

17. A system comprising:
  a management service; and
  a plurality of devices, each of said plurality of devices comprising:
    a plurality of transceivers; and
    transceiver selection circuitry to determine whether each of the plurality of transceivers with transceiver regulations associated with a location of the device, said transceiver regulations comprising at least one restriction related to duty cycle, transmitter power level, modulation scheme, antenna directionality, antenna height, allowable frequency band, or a combination thereof;

wherein:
  when the transceiver selection circuitry determines that at least one of the plurality of transceivers does not comply with said transceiver regulations, the transceiver selection circuitry disables the at least one transceiver of the plurality of transceivers that does not comply with said transceiver regulations; and
  when the transceiver selection circuitry determines that at least one of the plurality of transceivers complies with said transceiver regulations, the transceiver selection circuitry configures the at least one transceiver of the plurality of transceivers that complies with said transceiver regulations.

18. The system of claim 17, wherein the transceiver selection circuitry is to determine the location of the device.

19. The system of claim 17, wherein each of said plurality of devices further comprise a plurality of universal asynchronous receiver transmitters (UARTs), each of said plurality of UARTs including a respective one of said plurality of transceivers.

20. The system of claim 17, wherein the transceiver selection circuitry configures the at least one transceiver that complies with said transceiver regulations at least in part by configuring a maximum duty cycle of the at least one transceiver that complies with said transceiver regulations.

21. The system of claim 20, wherein at least one device of the plurality of devices is a coordinator node of a mesh network and includes at least a first transceiver and a second transceiver that are redundant.

22. The system of claim 17, wherein:
  the management service comprises a local transceiver regulatory data store; and
  the transceiver selection circuitry is further to:
    query each of the plurality of transceivers receivers to determine a transceiver identifier for each of the plurality of transceivers; and
    determine whether each of the plurality of transceivers complies with transceiver regulations associated with a location of the device at least in part by querying at least one of a transceiver regulatory database and/or a local transceiver regulatory data store using the identifier for each of the plurality of transceivers.

23. The system of claim 17, wherein the transceiver selection circuitry is further to determine whether each of said plurality of transceivers complies with said transceiver regulations: at a first deployment of the device; each time the device is activated; in response to a request from a management service; in response to detecting a change in location; in response to detecting a change in a transceiver operating parameter; or a combination of two or more thereof.

24. The system of claim 17, wherein each of the plurality of transceivers is selected from the group consisting of a Wi-Fi transceiver, a low power wide area transceiver, a cellular modem, a wireless mesh network transceiver, a near field communication transceiver, or a combination thereof.

* * * * *